(12) United States Patent
Yasuda et al.

(10) Patent No.: US 10,895,504 B2
(45) Date of Patent: Jan. 19, 2021

(54) TERAHERTZ WAVE SPECTROSCOPIC MEASUREMENT APPARATUS AND TERAHERTZ WAVE SPECTROSCOPIC MEASUREMENT METHOD

(71) Applicant: HAMAMATSU PHOTONICS K.K., Hamamatsu (JP)

(72) Inventors: Takashi Yasuda, Hamamatsu (JP);
Yoichi Kawada, Hamamatsu (JP);
Kazuki Horita, Hamamatsu (JP);
Hironori Takahashi, Hamamatsu (JP);
Takayoshi Kuga, Hamamatsu (JP);
Atsushi Nakanishi, Hamamatsu (JP);
Kazutaka Tomari, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 87 days.

(21) Appl. No.: 16/039,163

(22) Filed: Jul. 18, 2018

(65) Prior Publication Data

US 2019/0025124 A1 Jan. 24, 2019

(30) Foreign Application Priority Data

Jul. 19, 2017 (JP) ................................. 2017-140001

(51) Int. Cl.
*G01J 3/42* (2006.01)
*G01J 3/02* (2006.01)
(Continued)

(52) U.S. Cl.
CPC ............... *G01J 3/42* (2013.01); *G01J 3/0224* (2013.01); *G01N 21/3586* (2013.01);
(Continued)

(58) Field of Classification Search
None
See application file for complete search history.

(56) References Cited

U.S. PATENT DOCUMENTS

| 6,208,422 B1* | 3/2001 | Naya | G01N 21/553 |
| | | | 356/445 |
| 2006/0231762 A1* | 10/2006 | Ohtake | G01N 21/552 |
| | | | 250/341.8 |
| 2015/0129768 A1* | 5/2015 | Koizumi | G01N 21/3581 |
| | | | 250/341.1 |

FOREIGN PATENT DOCUMENTS

JP 2008-224449 A 9/2008
JP 5607566 B2 10/2014

* cited by examiner

*Primary Examiner* — Edwin C Gunberg
(74) *Attorney, Agent, or Firm* — Faegre Drinker Biddle & Reath LLP

(57) ABSTRACT

A measurement auxiliary member is placed on an arrangement surface of a prism. A measurement object is placed on an upper surface of the measurement auxiliary member. The measurement auxiliary member totally reflects the terahertz wave input from a lower surface by the upper surface and outputs the totally-reflected terahertz wave from the lower surface. A main pulse of a terahertz wave totally reflected by the upper surface of the measurement auxiliary member without multiply-reflected inside any optical element on an optical path of the terahertz wave, and a noise pulse of a terahertz wave multiply-reflected inside any optical element on the optical path and reflected on an interface between the prism and the measurement auxiliary member, are temporally separated from each other when detecting a correlation by a terahertz wave detection element.

24 Claims, 20 Drawing Sheets

(51) Int. Cl.
    *G01N 21/3586* (2014.01)
    *G01N 21/552* (2014.01)
(52) U.S. Cl.
    CPC ...... *G01J 2003/425* (2013.01); *G01N 21/552* (2013.01); *G01N 2201/06113* (2013.01)

TERAHERTZ WAVE SPECTROSCOPIC MEASUREMENT APPARATUS AND TERAHERTZ WAVE SPECTROSCOPIC MEASUREMENT METHOD

BACKGROUND OF THE INVENTION

Field of the Invention

The present invention relates to a terahertz wave spectroscopic measurement apparatus and a terahertz wave spectroscopic measurement method.

Related Background Art

A terahertz wave is an electromagnetic wave having a frequency of about 0.01 THz to 100 THz corresponding to an intermediate region between a light wave and a radio wave, and has an intermediate property between the light wave and the radio wave. As an application of such a terahertz wave, a technique of acquiring information on a measurement object by measuring a temporal waveform of an electric field amplitude of the terahertz wave passed through or reflected by the measurement object has been studied.

Further, as disclosed in Patent Documents 1 and 2, there is a case where information on a measurement object is acquired using a terahertz wave by making the terahertz wave to be totally reflected on one plane (measurement surface) of a prism to generate an evanescent component and irradiating the measurement object on the measurement surface with the evanescent component of the terahertz wave. In such a technique utilizing the total reflection of the terahertz wave, the measurement object is not limited to a solid.

Patent Document 1: Japanese Patent Application Laid-Open Publication No. 2008-224449

Patent Document 2: Japanese Patent Publication No. 5607566

SUMMARY OF THE INVENTION

In the terahertz wave spectroscopic measurement technique using the total reflection of the terahertz wave on the measurement surface of the prism as described above, the measurement object can be placed directly on the measurement surface of the prism. In such a case, however, there are the following problems. It is not easy to perform cleaning work such as wiping off the measurement object on the measurement surface of the prism after measurement. It is difficult to recover a small amount of the measurement object on the measurement surface of the prism after measurement. Further, there is a case where the measurement surface is scratched when the powder shaped measurement object is pressed toward the measurement surface of the prism so as to be in close contact therewith.

In order to solve such problems, the present inventors have conducted studies to provide a measurement auxiliary member for placing a measurement object thereon separately from the prism. That is, the measurement auxiliary member is placed on one plane of the prism, and the measurement object is placed on an upper surface of the measurement auxiliary member. The terahertz wave input to the prism propagates from the inside of the prism to the inside of the measurement auxiliary member and is totally reflected on the upper surface of the measurement auxiliary member. The totally-reflected terahertz wave propagates again from the inside of the measurement auxiliary member to the inside of the prism and is output from the prism to the outside. By adopting such a configuration, it is possible to freely perform the attachment or detachment and replacement of the measurement auxiliary member with respect to the prism while keeping an optical system including the prism unchanged, and thus, the above problems can be solved.

However, the present inventors have conducted further studies regarding a terahertz wave spectroscopic measurement technique having such a configuration in which the measurement auxiliary member for placing the measurement object thereon is provided separately from the prism, and found out that measurement accuracy deteriorates in some cases.

The present invention has been made in order to solve the above problem, and an object thereof is to provide a terahertz wave spectroscopic measurement apparatus and a terahertz wave spectroscopic measurement method capable of suppressing deterioration of measurement accuracy in a configuration in which a measurement auxiliary member for placing a measurement object thereon is provided separately from a prism.

A terahertz wave spectroscopic measurement apparatus according to the present invention includes (1) a light source configured to output pulsed laser light; (2) a branching unit configured to branch the pulsed laser light to output pump light and probe light; (3) a terahertz wave generation element configured to generate and output a terahertz wave by inputting the pump light; (4) a prism configured to have an input surface, an output surface, and an arrangement surface, propagate the terahertz wave output from the terahertz wave generation element and input to the input surface in the inside from the input surface to the arrangement surface, propagate in the inside from the arrangement surface to the output surface, and output the terahertz wave from the output surface to the outside; (5) a measurement auxiliary member configured to have an input-output surface and a total reflection surface, be arranged such that the input-output surface faces the arrangement surface of the prism, allow a measurement object to be arranged on the total reflection surface, propagate the terahertz wave input to the input-output surface from the arrangement surface of the prism in the inside from the input-output surface to the total reflection surface to be totally reflected by the total reflection surface, propagate the totally-reflected terahertz wave in the inside from the total reflection surface to the input-output surface to be output from the input-output surface, and input the terahertz wave from the arrangement surface to the inside of the prism; and (6) a terahertz wave detection element configured to input the terahertz wave output from the output surface of the prism and the probe light output from the branching unit and detect a correlation between the terahertz wave and the probe light.

Further, in the above terahertz wave spectroscopic measurement apparatus, a thickness or a refractive index of the measurement auxiliary member is set such that a main pulse, which is a pulse of a terahertz wave totally reflected by the total reflection surface of the measurement auxiliary member without being multiply-reflected inside any optical element on an optical path of the terahertz wave, and a noise pulse, which is a pulse of a terahertz wave multiply-reflected inside any optical element on the optical path of the terahertz wave and reflected on an interface between the prism and the measurement auxiliary member, are temporally separated from each other when detecting the correlation by the terahertz wave detection element.

A terahertz wave spectroscopic measurement method according to the present invention performs a terahertz wave spectroscopic measurement on a measurement object by branching pulsed laser light output from a light source by a branching unit to output pump light and probe light, generating and outputting a terahertz wave by a terahertz wave generation element by inputting the pump light, and detecting a correlation between the terahertz wave passed through the measurement object and the probe light by a terahertz wave detection element. The above terahertz wave spectroscopic measurement method includes (a) arranging a prism configured to have an input surface, an output surface, and an arrangement surface, and a measurement auxiliary member configured to have an input-output surface and a total reflection surface, on an optical path of the terahertz wave such that the input-output surface of the measurement auxiliary member faces the arrangement surface of the prism, and arranging the measurement object on the total reflection surface of the measurement auxiliary member; (b) propagating the terahertz wave output from the terahertz wave generation element and input to the input surface of the prism in the inside of the prism from the input surface to the arrangement surface, and then, propagating the terahertz wave in the inside of the measurement auxiliary member from the input-output surface to the total reflection surface to totally reflect the terahertz wave by the total reflection surface of the measurement auxiliary member; and (c) propagating the totally-reflected terahertz wave in the inside of the measurement auxiliary member from the total reflection surface to the input-output surface, and then, propagating the terahertz wave in the inside of the prism from the arrangement surface to the output surface to output the terahertz wave from the output surface of the prism to the terahertz wave detection element.

Further, in the above terahertz wave spectroscopic measurement method, in the terahertz wave spectroscopic measurement, the measurement auxiliary member of which a thickness or a refractive index is set such that a main pulse, which is a pulse of a terahertz wave totally reflected by the total reflection surface of the measurement auxiliary member without being multiply-reflected inside any optical element on an optical path of the terahertz wave, and a noise pulse, which is a pulse of a terahertz wave multiply-reflected inside any optical element on the optical path of the terahertz wave and reflected on an interface between the prism and the measurement auxiliary member, are temporally separated from each other when detecting the correlation by the terahertz wave detection element is used.

According to the present invention, it is possible to suppress deterioration in measurement accuracy in the configuration in which the measurement auxiliary member for placing the measurement object is provided separately from the prism.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE EMBODIMENTS

Hereinafter, embodiments for carrying out the present invention will be described in detail with reference to the accompanying drawings. In the description of the drawings, the same elements will be denoted by the same reference signs, and redundant descriptions will be omitted. The present invention is not limited to these examples.

Figure 1:
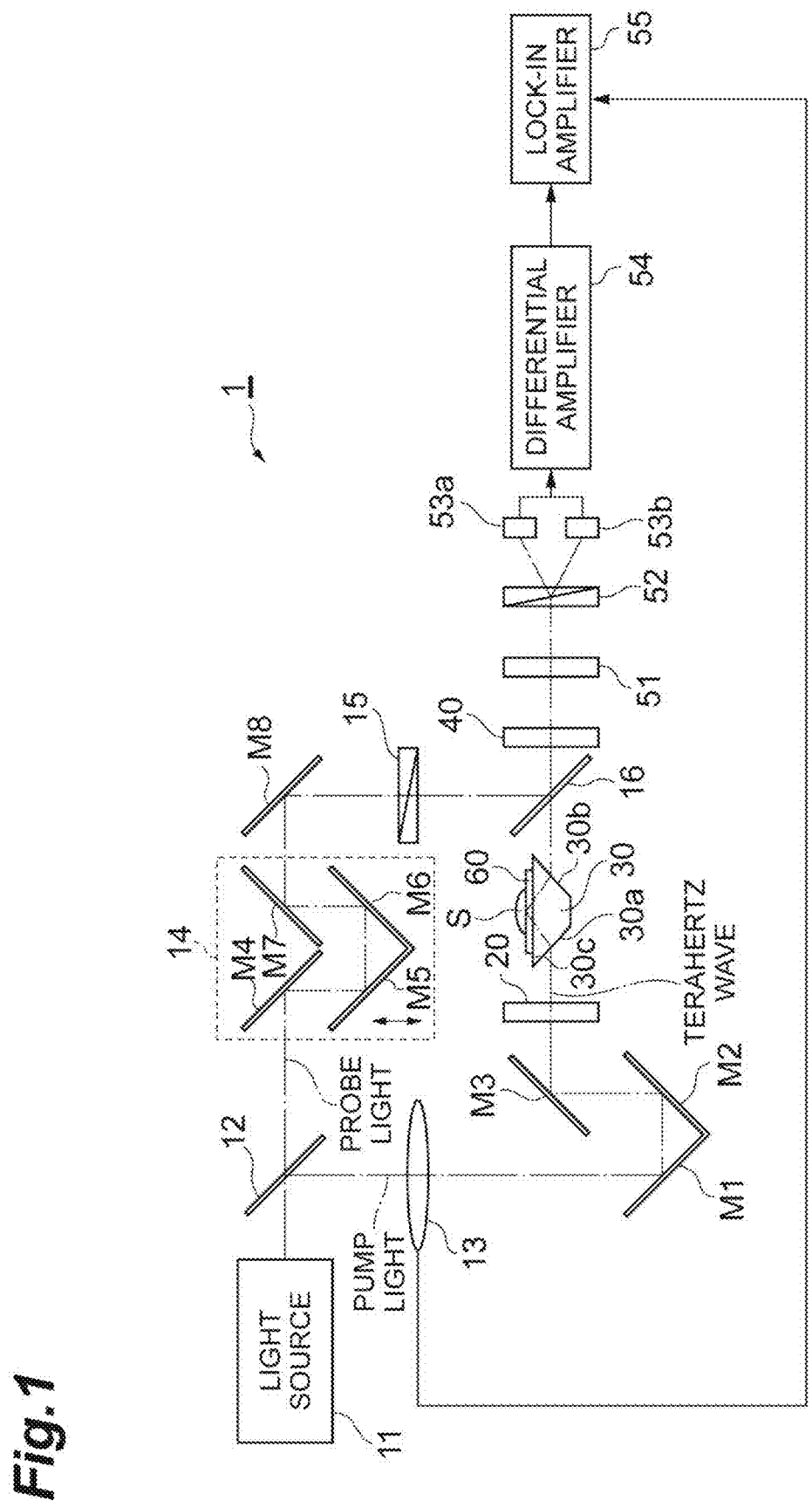
FIG. 1 is a diagram illustrating a configuration of a terahertz wave spectroscopic measurement apparatus 1.

FIG. 1 is a diagram illustrating a configuration of a terahertz wave spectroscopic measurement apparatus 1. The terahertz wave spectroscopic measurement apparatus 1 is configured to acquire information (for example, an absorption coefficient, a refractive index) of a measurement object S by a total reflection measurement method using a terahertz wave, and includes a light source 11, a branching unit 12, a chopper 13, an optical path difference adjusting unit 14, a polarizer 15, a combining unit 16, a terahertz wave generation element 20, a prism 30, a terahertz wave detection element 40, a ¼ wavelength plate 51, a polarization separation element 52, a photodetector 53a, a photodetector 53b, a differential amplifier 54, a lock-in amplifier 55, and a measurement auxiliary member 60.

The light source 11 outputs pulsed laser light with a constant repetition period. The light source 11 is preferably a femtosecond pulsed laser light source. The femtosecond pulsed laser light source can output pulsed laser light having a pulse width on the order of femtoseconds. The branching unit 12 is, for example, a beam splitter, and branches the pulsed laser light output from the light source 11 into two components. The branching unit 12 outputs one of the branched pulsed laser light to a mirror M1 as pump light and outputs the other to a mirror M4 as probe light.

The chopper 13 is provided on an optical path of the pump light between the branching unit 12 and the mirror M1. The chopper 13 alternately repeats transmitting and blocking of the pump light at a constant period. The pump light, which has been output from the branching unit 12 and passed through the chopper 13, is sequentially reflected by the mirrors M1 to M3 and input to the terahertz wave generation element 20. Here, an optical system of the pump light from the branching unit 12 to the terahertz wave generation element 20 will be referred to as "a pump optical system", hereinafter.

The terahertz wave generation element 20 generates and outputs a pulsed terahertz wave by inputting the pump light. The terahertz wave generation element 20 is configured to include, for example, any one of a non-linear optical crystal (for example, ZnTe), a photoconductive antenna element (for example, an optical switch using GaAs), a semiconductor (for example, InAs), and a superconductor. When the terahertz wave generation element 20 includes the non-linear optical crystal, the terahertz wave generation element 20 can generate a terahertz wave by a non-linear optical phenomenon occurring with incidence of pump light.

A terahertz wave is an electromagnetic wave having a frequency of about 0.01 THz to 100 THz corresponding to an intermediate region between a light wave and a radio wave, and has an intermediate property between the light wave and the radio wave. Further, the pulsed terahertz wave is generated at a constant repetition period, and a pulse width thereof is on the order of a few picoseconds. The terahertz wave output from the terahertz wave generation element 20 is input to the prism 30.

The prism 30 has an input surface 30a, an output surface 30b, and an arrangement surface 30c. The prism 30 inputs the terahertz wave output from the terahertz wave generation element 20 to the input surface 30a. The prism 30 propagates the terahertz wave in the inside and outputs the terahertz wave from the output surface 30b to the outside. The terahertz wave output from the output surface 30b is input to the combining unit 16. Here, an optical system of the terahertz wave from the terahertz wave generation element 20 to the combining unit 16 will be referred to as "a terahertz wave optical system", hereinafter.

The measurement auxiliary member 60 is arranged on the arrangement surface 30c of the prism 30. The measurement object S is arranged on an upper surface of the measurement auxiliary member 60. The measurement auxiliary member 60 totally reflects the terahertz wave input from a lower surface to the inside on the upper surface and outputs the totally-reflected terahertz wave from the lower surface. Details of the prism 30 and the measurement auxiliary member 60 will be described later.

The probe light output from the branching unit 12 is sequentially reflected by the mirrors M4 to M8, passes through the polarizer 15, and is input to the combining unit 16. Here, an optical system of the probe light from the branching unit 12 to the combining unit 16 will be referred to as "a probe optical system", hereinafter. The four mirrors M4 to M7 constitute the optical path difference adjusting unit 14. That is, as the mirrors M5 and M6 move, optical path lengths between the mirrors M4 and M7 and the mirrors M5 and M6 are adjusted, and an optical path length of the probe optical system is adjusted. As a result, the optical path difference adjusting unit 14 can adjust a difference between the optical path length of the pump optical system and the terahertz wave optical system from the branching unit 12 to the combining unit 16 via the terahertz wave generation element 20 and the optical path length of the probe optical system from the branching unit 12 to the combining unit 16.

The combining unit 16 inputs the terahertz wave output from the output surface 30b of the prism 30 and the probe light output from the branching unit 12 and reaching thereto. Further, the combining unit 16 combines these input terahertz wave and probe light so as to be coaxial with each other, and outputs these to the terahertz wave detection element 40. The combining unit 16 is preferably a pellicle which is a film shaped mirror that has been attached to a rigid support frame and stretched to be thin.

The terahertz wave detection element 40 detects a correlation between the terahertz wave and the probe light. The terahertz wave detection element 40 is configured to include, for example, any one of a non-linear optical crystal (for example, ZnTe) and a photoconductive antenna element (for example, an optical switch using GaAs). When the terahertz wave detection element 40 includes the non-linear optical crystal, the terahertz wave detection element 40 inputs the terahertz wave and the probe light output from the combining unit 16, changes a polarization state of the probe light by birefringence induced by the Pockels effect accompanying the propagation of the terahertz wave, and outputs the probe light. Since the amount of birefringence at this time depends on an electric field intensity of the terahertz wave, the change amount in the polarization state of the probe light in the terahertz wave detection element 40 depends on the electric field intensity of the terahertz wave.

The polarization separation element 52 is, for example, a Wollaston prism. The polarization separation element 52 inputs the probe light, which has been output from the terahertz wave detection element 40 and passed through the ¼ wavelength plate 51, separates the input probe light into two polarization components orthogonal to each other, and outputs the separated components. The photodetectors 53a and 53b include, for example, photodiodes, detect each power of the two polarization components of the probe light obtained by the polarization separation using the polarization separation element 52, and output electric signals having values corresponding to the detected powers to the differential amplifier 54.

The differential amplifier 54 inputs the electric signals output from the photodetectors 53a and, 53b, respectively, and outputs an electric signal having a value corresponding to a difference between the values of both the electric signals to the lock-in amplifier 55. The lock-in amplifier 55 synchronously detects the electric signal output from the differential amplifier 54 at a repetition frequency of transmitting and blocking of the pump light in the chopper 13. The signal output from the lock-in amplifier 55 has a value that depends on the electric field intensity of the terahertz wave input to the terahertz wave detection element 40.

As the optical path length between the mirrors M4 and M7 and the mirrors M5 and M6 is adjusted in the optical path difference adjusting unit 14 to adjust the optical path length of the probe optical system, a time difference between timings of the terahertz wave and the probe light input to the terahertz wave detection element 40 is adjusted. As described above, in general, the pulse width of the probe light is on the order of femtoseconds while the pulse width of the terahertz wave is on the order of picoseconds, and the pulse width of the probe light is narrower than that of the terahertz wave by several orders of magnitude. Accordingly, a temporal waveform of an electric field amplitude of the pulsed terahertz wave is obtained as an incident timing of the probe light to the terahertz wave detection element 40 is swept by the optical path difference adjusting unit 14. It is possible to obtain the information (for example, the absorption coefficient, the refractive index) on the measurement object S from the temporal waveform of the electric field amplitude of the terahertz wave.

Figure 2:
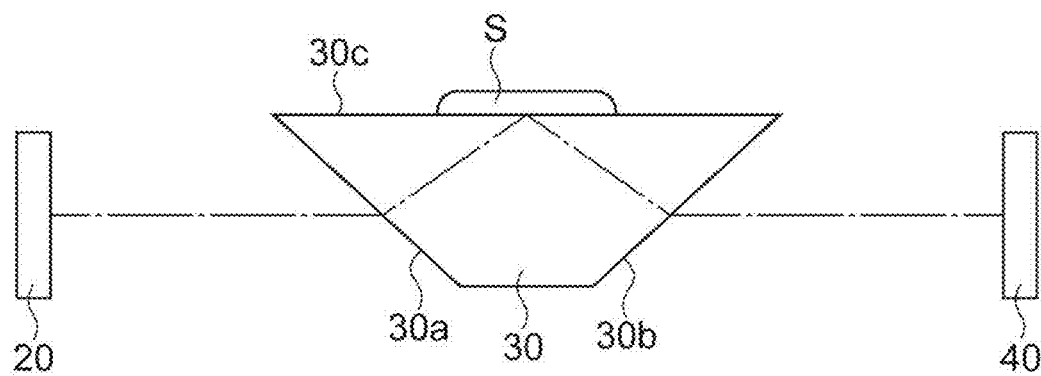
FIG. 2 is a diagram illustrating a configuration of a prism 30 according to a conventional example.
Figure 3:
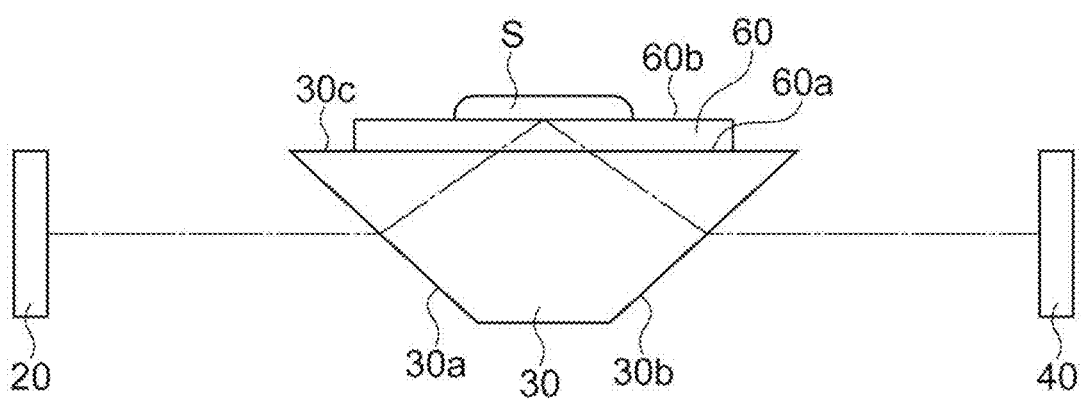
FIG. 3 is a diagram illustrating a detailed configuration of a prism 30 and a measurement auxiliary member 60 according to an embodiment.

FIG. 2 is a diagram illustrating a configuration of the prism 30 according to a conventional example. FIG. 3 is a diagram illustrating a detailed configuration of the prism 30 and the measurement auxiliary member 60 according to the embodiment. The terahertz wave generation element 20 and the terahertz wave detection element 40 are also illustrated in these figures.

In the conventional example (FIG. 2), the measurement object S is placed directly on the arrangement surface 30c of the prism 30. A terahertz wave input from the input surface 30a of the prism 30 to the inside is totally reflected on the arrangement surface 30c, and then, output to the outside from the output surface 30b. The measurement object S placed directly on the arrangement surface 30c is irradiated with an evanescent component generated at the time of total reflection of the terahertz wave by the arrangement surface 30c. As a result, the acquisition of information on the measurement object S using the terahertz wave is performed.

In the conventional example, however, it is not easy to perform cleaning work such as wiping off the measurement object S on the arrangement surface 30c of the prism 30 after measurement. It is difficult to recover a small amount of the measurement object S on the arrangement surface 30c of the prism 30 after measurement. Further, there is a case where the arrangement surface 30c is scratched when the measurement object S such as powder is pressed toward the surface 30c of the prism 30 so as to be in close contact therewith.

On the other hand, the measurement auxiliary member 60 for placing the measurement object S thereon is provided separately from the prism 30 in the embodiment (FIG. 3).

The prism 30 propagates the terahertz wave, output from the terahertz wave generation element and input to the input surface 30a, in the inside from the input surface 30a to the arrangement surface 30c. Further, the prism 30 propagates the terahertz wave in the inside from the arrangement surface 30c to the output surface 30b, and outputs the terahertz wave from the output surface 30b to the outside.

The measurement auxiliary member 60 is preferably a flat plate shaped member and has an input-output surface 60a and a total reflection surface 60b which are parallel to each other. The measurement auxiliary member 60 is arranged such that the input-output surface 60a faces the arrangement surface 30c of the prism 30. The measurement object S is placed on the total reflection surface 60b of the measurement auxiliary member 60.

The measurement auxiliary member 60 propagates the terahertz wave, input from the arrangement surface 30c of the prism 30 to the input-output surface 60a, in the inside from the input-output surface 60a to the total reflection surface 60b and causes the terahertz wave to be totally reflected by the total reflection surface 60b. The measurement auxiliary member 60 propagates the totally-reflected terahertz wave in the inside from the total reflection surface 60b to the input-output surface 60a, and outputs the terahertz wave from the input-output surface 60a. The measurement auxiliary member 60 inputs the terahertz wave from the arrangement surface 30c into the inside of the prism 30 again.

The prism 30 and the measurement auxiliary member 60 are transparent in a wavelength region of the terahertz wave. The measurement auxiliary member 60 is preferably made of the same material as that of the prism 30, but may be made of a material different from that of the prism 30.

For example, sapphire, an olefin-based material (for example, polymethylpentene), PE (polyethylene), SiO$_2$, Si, Ge, GaAs, or the like can be used as the material of the measurement auxiliary member 60. The measurement auxiliary member 60 is preferably made of a material having the same refractive index as that of the prism 30. Further, an incident angle of the terahertz wave to the total reflection surface 60b and a refractive index of the measurement auxiliary member 60 are set such that the terahertz wave is totally reflected by the total reflection surface 60b.

The terahertz wave, which has been output from the terahertz wave generation element 20 and input to the input surface 30a of the prism 30, is propagated from the input surface 30a to the arrangement surface 30c inside the prism 30, and then, is propagated from the input-output surface 60a to the total reflection surface 60b inside the measurement auxiliary member 60, and is totally reflected by the total reflection surface 60b of the measurement auxiliary member 60. The totally-reflected terahertz wave is propagated from the total reflection surface 60b to the input-output surface 60a inside the measurement auxiliary member 60, and then, is propagated from the arrangement surface 30c to the output surface 30b inside the prism 30, and is output from the output surface 30b of the prism 30 to the terahertz wave detection element 40.

The measurement object S placed on the total reflection surface 60b is irradiated with the evanescent component generated at the time of total reflection of the terahertz wave on the total reflection surface 60b of the measurement auxiliary member 60. As a result, the acquisition of information on the measurement object S using the terahertz wave is performed.

In this embodiment, it is possible to freely perform the attachment or detachment and replacement of the measurement auxiliary member 60 for the prism 30 while keeping the optical system including the prism 30 unchanged, and thus, the above problem in the conventional example can be solved. In particular, when the terahertz wave generation element 20 is integrally provided on the input surface 30a of the prism 30, and/or when the terahertz wave detection element 40 is integrally provided on the output surface 30b of the prism 30, the above effect that it is possible to solve the problem of the conventional example is great.

Figure 4:
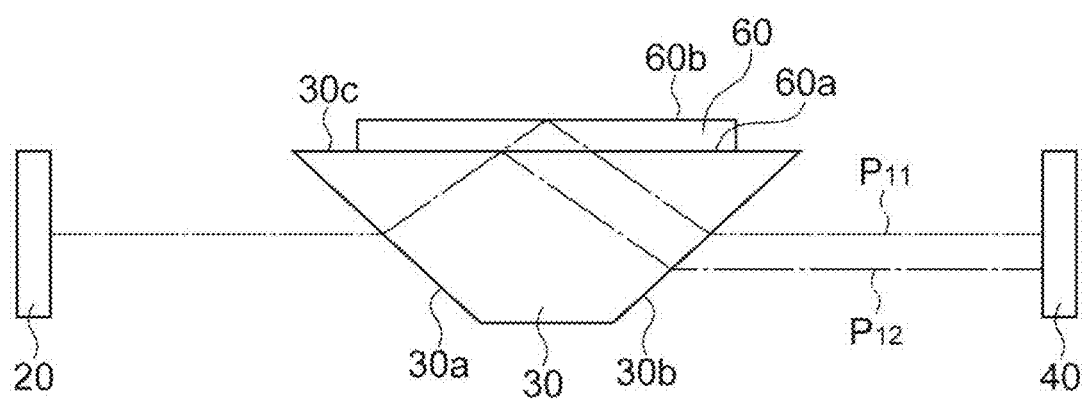
FIG. 4 is a diagram for describing each propagation path of a main pulse $P_{11}$ and an interface reflected pulse $P_{12}$ generated in the configuration including the prism 30 and the measurement auxiliary member 60 according to the embodiment.

However, when the measurement auxiliary member 60 is placed on the arrangement surface 30c of the prism 30 as illustrated in FIG. 1 and FIG. 3, not only the pulse (main pulse $P_{11}$) of the terahertz wave totally reflected by the total reflection surface 60b of the measurement auxiliary member 60 but also the pulse (interface reflected pulse $P_{12}$) of the terahertz wave reflected by the interface (the arrangement surface 30c or the input-output surface 60a) between the prism 30 and the measurement auxiliary member 60 reaches the terahertz wave detection element 40 as illustrated in FIG. 4.

FIG. 4 is a diagram for describing respective propagation paths of the main pulse $P_{11}$ and the interface reflected pulse $P_{12}$ generated in the configuration including the prism 30 and the measurement auxiliary member 60 of the embodiment. Since the pulse width of the terahertz wave is on the order of picoseconds, the main pulse $P_{11}$ and the interface reflected pulse $P_{12}$ can be temporally separated from each other in the terahertz wave detection element 40, when a difference in the optical path length between these pulses until reaching the terahertz wave detection element 40 is sufficiently larger than a pulse width equivalent length (an optical path length by which the terahertz wave propagates in a time of a pulse width). When the main pulse $P_{11}$ and the interface reflected pulse $P_{12}$ are temporally separated from each other, deterioration of measurement accuracy caused by the interface reflected pulse $P_{12}$ is suppressed in the terahertz wave spectroscopic measurement for the measurement object S based on the temporal waveform of the electric field of the main pulse $P_{11}$.

Figure 5:
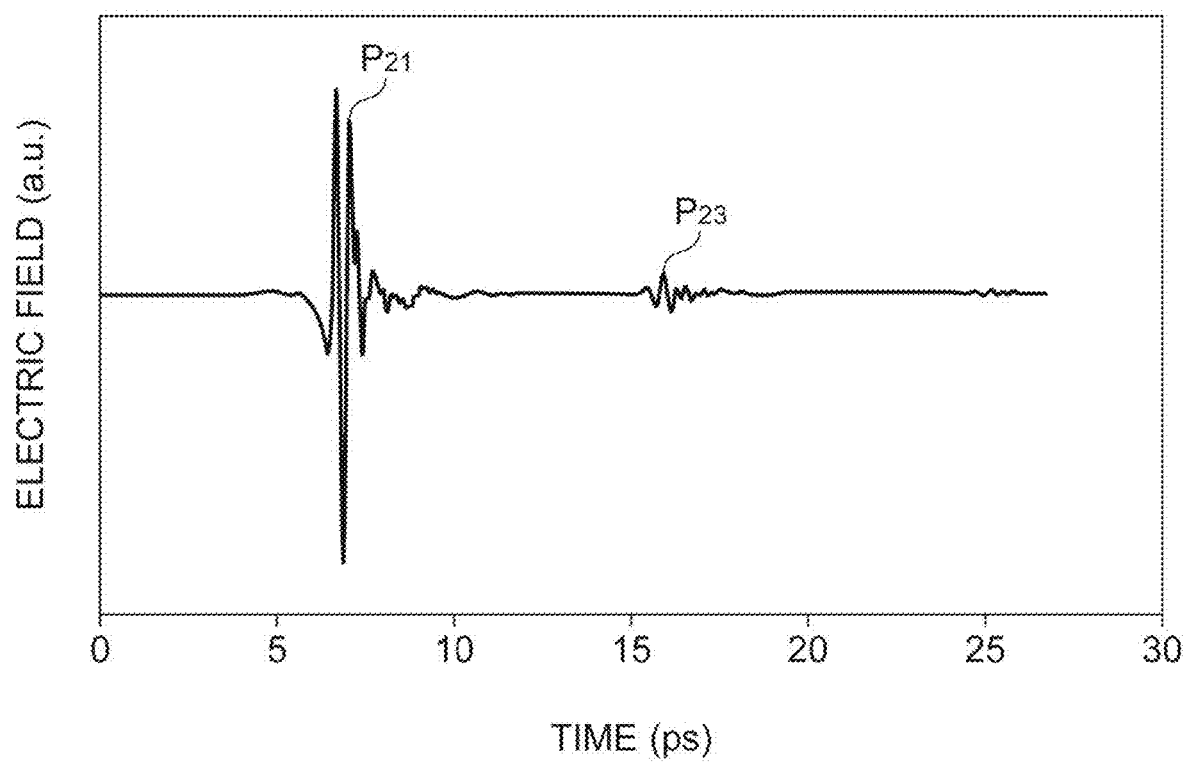
FIG. 5 is a graph illustrating a measurement result example of an electric field temporal waveform of a terahertz wave when the measurement auxiliary member 60 is not placed on an arrangement surface 30c of the prism 30.

FIG. 5 is a graph illustrating a measurement result example of the electric field temporal waveform of the terahertz wave when the measurement auxiliary member 60 is not placed on the arrangement surface 30c of the prism 30 (FIG. 2). When the measurement auxiliary member 60 is not placed on the arrangement surface 30c of the prism 30, the electric field temporal waveform of the terahertz wave at the time of detecting the correlation by the terahertz wave detection element 40 includes a pulse $P_{21}$ generated by reflection on the arrangement surface 30c of the prism 30 and a pulse $P_{23}$ that exists after the pulse $P_{21}$.

It is considered that the pulse $P_{23}$ is generated as a part of the pulse $P_{21}$ is multiply-reflected inside any optical element on the optical path of the terahertz wave, while the pulse $P_{21}$ is not multiply-reflected inside any optical element on the optical path of the terahertz wave.

Optical elements, which are present on the optical path of the terahertz wave and capable of generating multiple reflection inside thereof, include the terahertz wave generation element 20 and the terahertz wave detection element 40. Further, when a filter configured to selectively block the pump light and selectively transmit the terahertz wave is provided on the optical path between the terahertz wave generation element 20 and the prism 30, this filter is also included in the optical elements.

Figure 6:
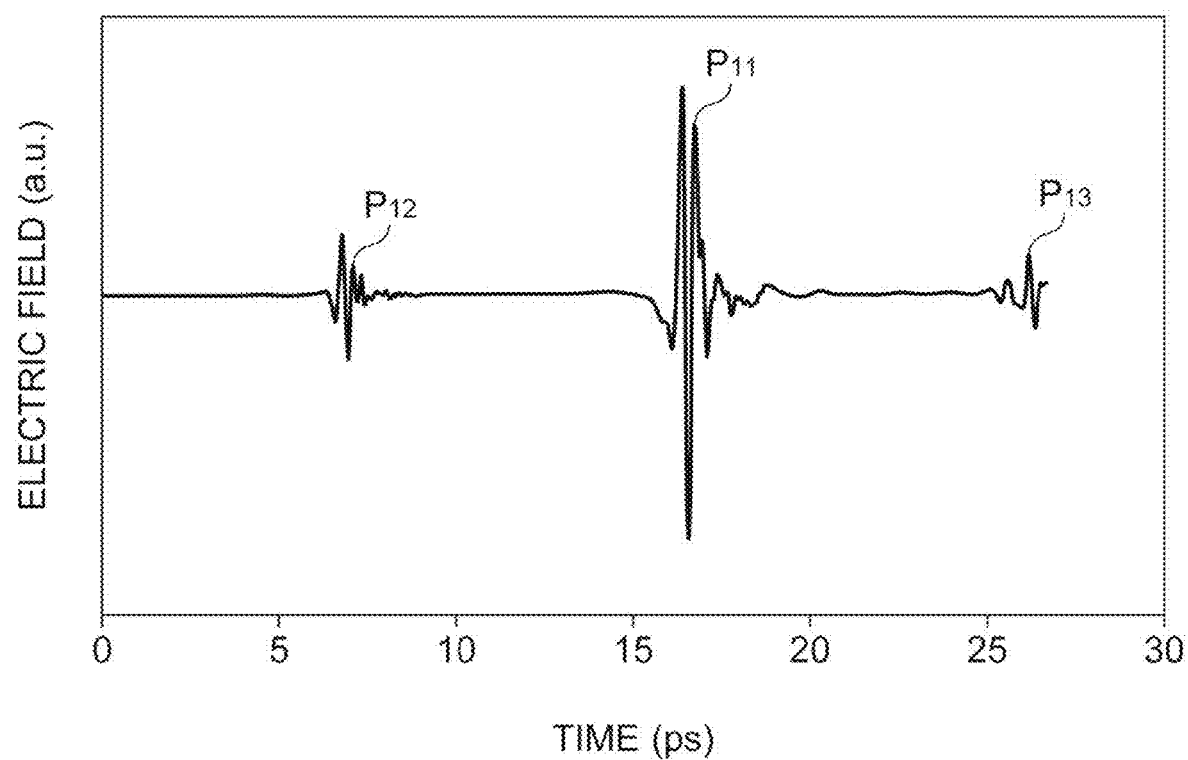
FIG. 6 is a graph illustrating a measurement result example of an electric field temporal waveform of a terahertz wave when the measurement auxiliary member 60 is placed on the arrangement surface 30c of the prism 30.

FIG. 6 is a graph illustrating a measurement result example of the electric field temporal waveform of the terahertz wave when the measurement auxiliary member 60 is placed on the arrangement surface 30c of the prism 30 (FIG. 3). When the measurement auxiliary member 60 is placed on the arrangement surface 30c of the prism 30, the electric field temporal waveform of the terahertz wave at the time of detecting the correlation by the terahertz wave detection element 40 includes the main pulse $P_{11}$ generated by the total reflection on the total reflection surface 60b of the measurement auxiliary member 60, the interface reflected pulse $P_{12}$ generated by the reflection on the interface between the prism 30 and the measurement auxiliary member 60, and a pulse $P_{13}$ that exists after the main pulse $P_{11}$.

The main pulse $P_{11}$ and the interface reflected pulse $P_{12}$ are temporally separated from each other. It is considered that the pulse $P_{13}$ is generated as a part of the main pulse $P_{11}$ is multiply-reflected inside any optical element on the optical path of the terahertz wave, while the main pulse $P_{11}$ and the interface reflected pulse $P_{12}$ are not multiply-reflected inside any optical element on the optical path of the terahertz wave.

It is considered that there is also a pulse (noise pulse $P_{14}$) caused by multiple reflection of a part of the interface reflected pulse $P_{12}$ inside any optical element on the optical path of the terahertz wave due to factors similar to the generation of the pulse $P_{13}$. When the main pulse $P_{11}$ and the noise pulse $P_{14}$ temporally overlap with each other at the time of detecting the correlation by the terahertz wave detection element 40, the measurement accuracy deteriorates. Results of experiments conducted by the present inventors to confirm such a fact will be described next.

Figure 7:
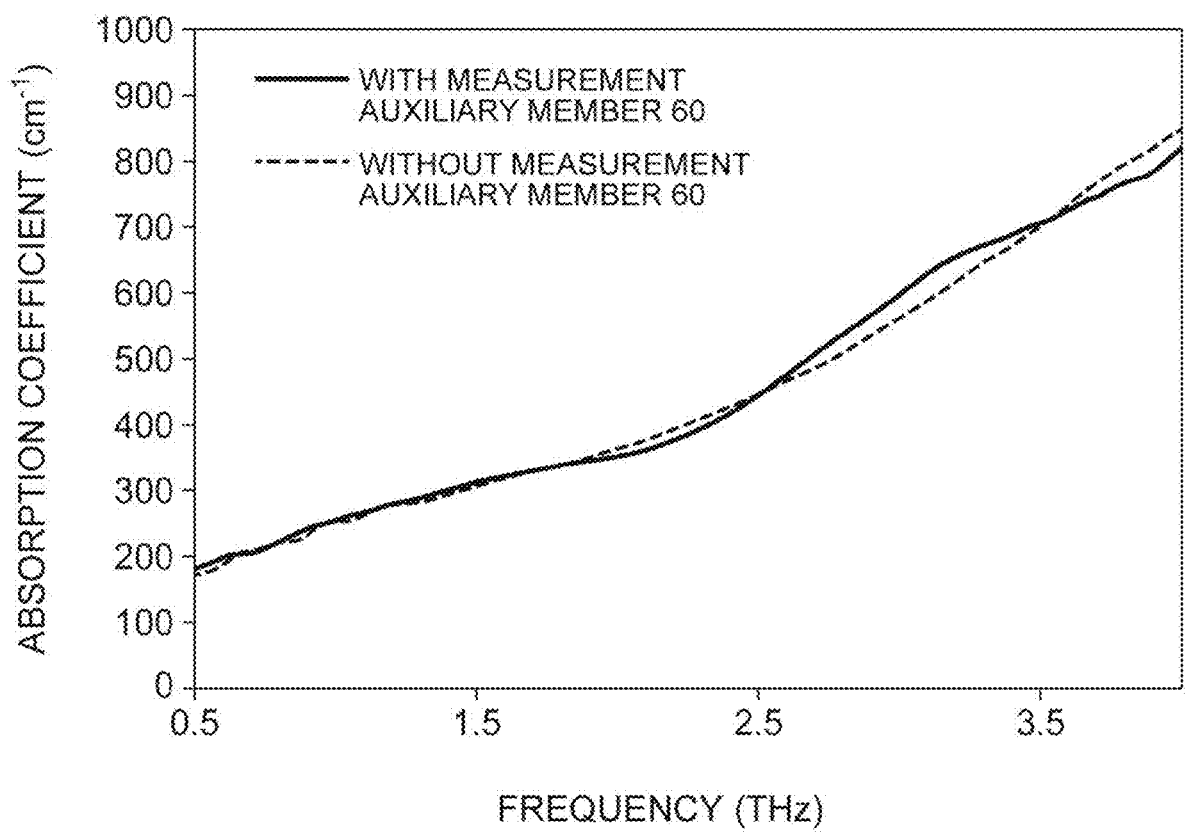
FIG. 7 is a graph illustrating a measurement result of an absorption spectrum obtained when water is measured as a measurement object S.
Figure 8:
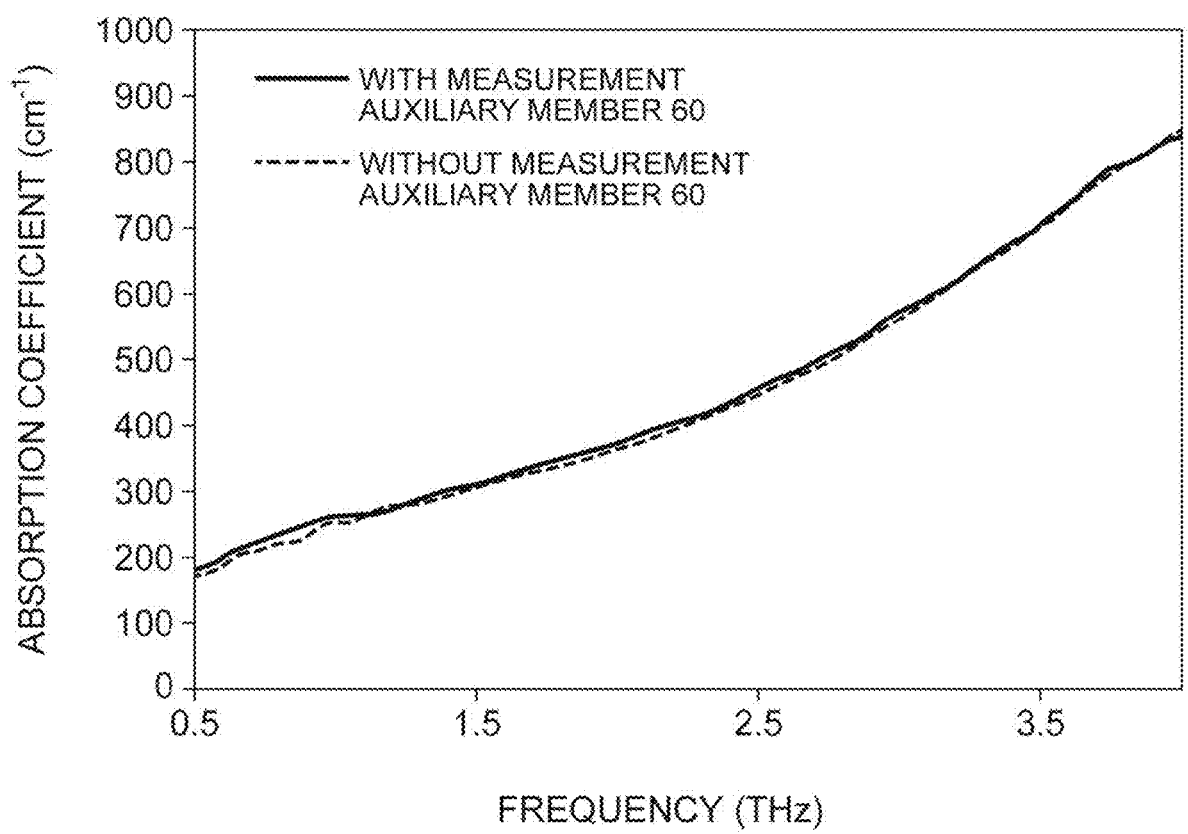
FIG. 8 is a graph illustrating a measurement result of an absorption spectrum obtained when water is measured as the measurement object S.

FIG. 7 and FIG. 8 are graphs illustrating measurement results of absorption spectra obtained when water is measured as the measurement object S. In each graph, the absorption spectrum in the case of not using the measurement auxiliary member 60 (FIG. 2) is indicated by a dashed line, and the absorption spectrum in the case of using the measurement auxiliary member 60 (FIG. 3) is indicated by a solid line. Each material of the prism 30 and the measurement auxiliary member 60 is silicon. The measurement auxiliary member 60 used in FIG. 8 is thicker than the measurement auxiliary member 60 used in FIG. 7.

As illustrated in FIG. 7, the absorption spectrum (solid line) obtained in the case of using the measurement auxiliary member 60 with a certain thickness has the substantially similar tendency as compared with the absorption spectrum (dashed line) obtained in the case of not using the measurement auxiliary member 60, but the modulation has been applied thereon. This is because the main pulse $P_{11}$ and the noise pulse $P_{14}$ temporally overlap with each other when detecting the correlation by the terahertz wave detection element 40.

On the other hand, as illustrated in FIG. 8, the absorption spectrum (solid line) obtained in the case of using the thicker measurement auxiliary member 60 is substantially coincident with the absorption spectrum (dashed line) obtained in the case of not using the measurement auxiliary member 60, and the modulation is suppressed. This is because the main pulse $P_{11}$ and the noise pulse $P_{14}$ are temporally separated from each other when detecting the correlation by the terahertz wave detection element 40.

Therefore, in the terahertz wave spectroscopic measurement apparatus or the terahertz wave spectroscopic measurement method according to the present embodiment, the main pulse $P_{11}$ of the terahertz wave totally reflected by the total reflection surface 60b of the measurement auxiliary member 60 without being multiply-reflected inside any optical element on the optical path of the terahertz wave, and the noise pulse $P_{14}$ of the terahertz wave multiply-reflected inside any optical element on the optical path of the terahertz wave and reflected on the interface between the prism 30 and the measurement auxiliary member 60, are temporally separated from each other when detecting the correlation by the terahertz wave detection element 40. When the main pulse $P_{11}$ and the noise pulse $P_{14}$ are temporally separated from each other, deterioration of measurement accuracy caused by the noise pulse $P_{14}$ is suppressed in the terahertz wave spectroscopic measurement for the measurement object S based on the temporal waveform of the electric field of the main pulse $P_{11}$.

Such pulse separation is realized by appropriately setting the thickness or the refractive index of the measurement auxiliary member 60 and making the difference in the optical path length between the main pulse $P_{11}$ and the noise pulse $P_{14}$ larger than the pulse width equivalent length. The optical path difference is preferably larger than twice the pulse width equivalent length. The pulse width is the full width at half maximum of a pulse drawn by an envelope of the electric field temporal waveform of the terahertz wave. When the plurality of noise pulses $P_{14}$ are present, the optical path differences between the main pulse $P_{11}$ and all the noise pulses $P_{14}$ are made larger than the pulse width equivalent length. When setting the thickness or the refractive index of the measurement auxiliary member 60, a thickness and a refractive index of the terahertz wave generation element 20, a thickness and a refractive index of the terahertz wave detection element 40, a shape, a size and a refractive index of the prism 30, respective propagation paths of the terahertz wave in these elements, and the like are taken into consideration.

Figure 9:
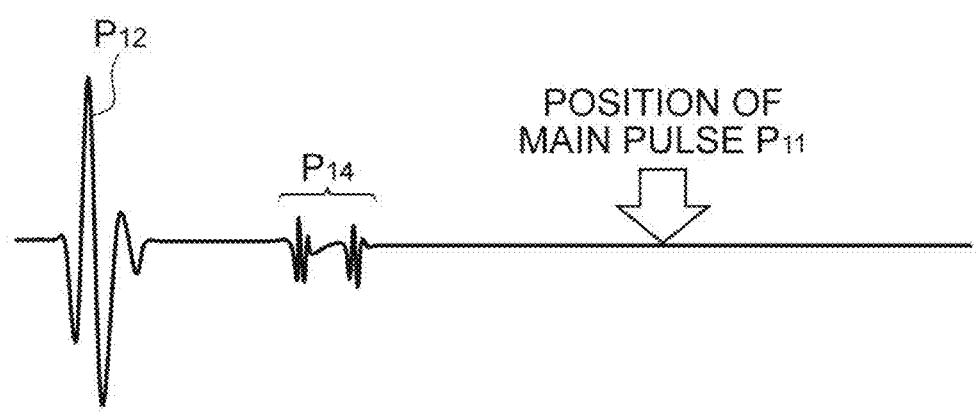
FIG. 9 is a view illustrating an example of a first mode in which a main pulse $P_{11}$ and a noise pulse $P_{14}$ are temporally separated from each other when detecting the correlation by a terahertz wave detection element 40.
Figure 10:
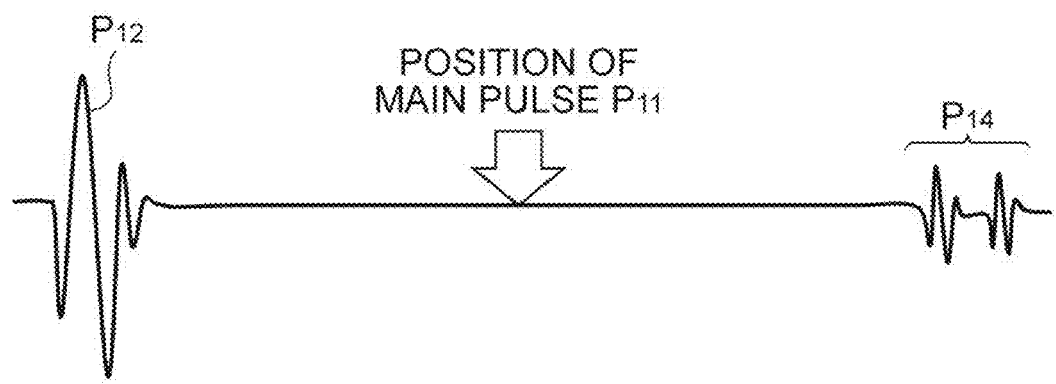
FIG. 10 is a view illustrating an example of a second mode in which the main pulse $P_{11}$ and the noise pulse $P_{14}$ are temporally separated from each other when detecting the correlation by the terahertz wave detection element 40.
Figure 11:
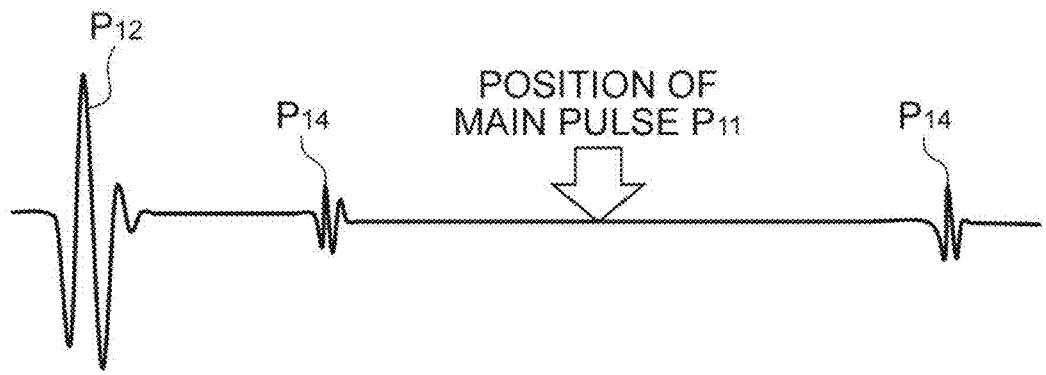
FIG. 11 is a view illustrating an example of a third mode in which the main pulse $P_{11}$ and the noise pulse $P_{14}$ are temporally separated from each other when detecting the correlation by the terahertz wave detection element 40.

FIG. 9 to FIG. 11 are views illustrating examples of modes in which the main pulse $P_{11}$ and the noise pulse $P_{14}$ are temporally separated from each other when detecting the correlation by the terahertz wave detection element 40. These views schematically illustrate the electric field temporal waveforms of the interface reflected pulse $P_{12}$ and the noise pulse $P_{14}$ when detecting the correlation by the terahertz wave detection element 40. Further, a position of the main pulse $P_{11}$ is indicated by an arrow in these figures.

FIG. 9 illustrates a first mode in which the main pulse $P_{11}$ is positioned temporally after the noise pulse $P_{14}$ when detecting the correlation by the terahertz wave detection element 40. This is effective when the noise pulse $P_{14}$ is close to the interface reflected pulse $P_{12}$, and is realized by using the thick measurement auxiliary member 60, for example. There are two noise pulses $P_{14}$ when the thicknesses or the refractive indices of the terahertz wave generation element 20 and the terahertz wave detection element 40 are different from each other, and in this case, the main pulse $P_{11}$ is positioned after the two noise pulses $P_{14}$.

FIG. 10 illustrates a second mode in which the main pulse $P_{11}$ is positioned temporally before the noise pulse $P_{14}$ (between the interface reflected pulse $P_{12}$ and the noise pulse $P_{14}$) when detecting the correlation by the terahertz wave detection element 40. This is effective when the noise pulse $P_{14}$ is far from the interface reflected pulse $P_{12}$, and is realized by using the thin measurement auxiliary member 60, for example. There are two noise pulses $P_{14}$ when the thicknesses or the refractive indices of the terahertz wave generation element 20 and the terahertz wave detection element 40 are different from each other, and in this case, the main pulse $P_{11}$ is positioned between the interface reflected pulse $P_{12}$ and the two noise pulses $P_{14}$.

FIG. 11 illustrates a third mode in which the main pulse $P_{11}$ is positioned between two adjacent noise pulses $P_{14}$ in the case where the plurality of noise pulses $P_{14}$ are present to be temporally separated from each other when detecting the correlation by the terahertz wave detection element 40. This is effective, for example, when the thicknesses or the refractive indices of the terahertz wave generation element 20 and the terahertz wave detection element 40 are greatly different from each other and the two noise pulses $P_{14}$ are greatly separated from each other.

Figure 12:
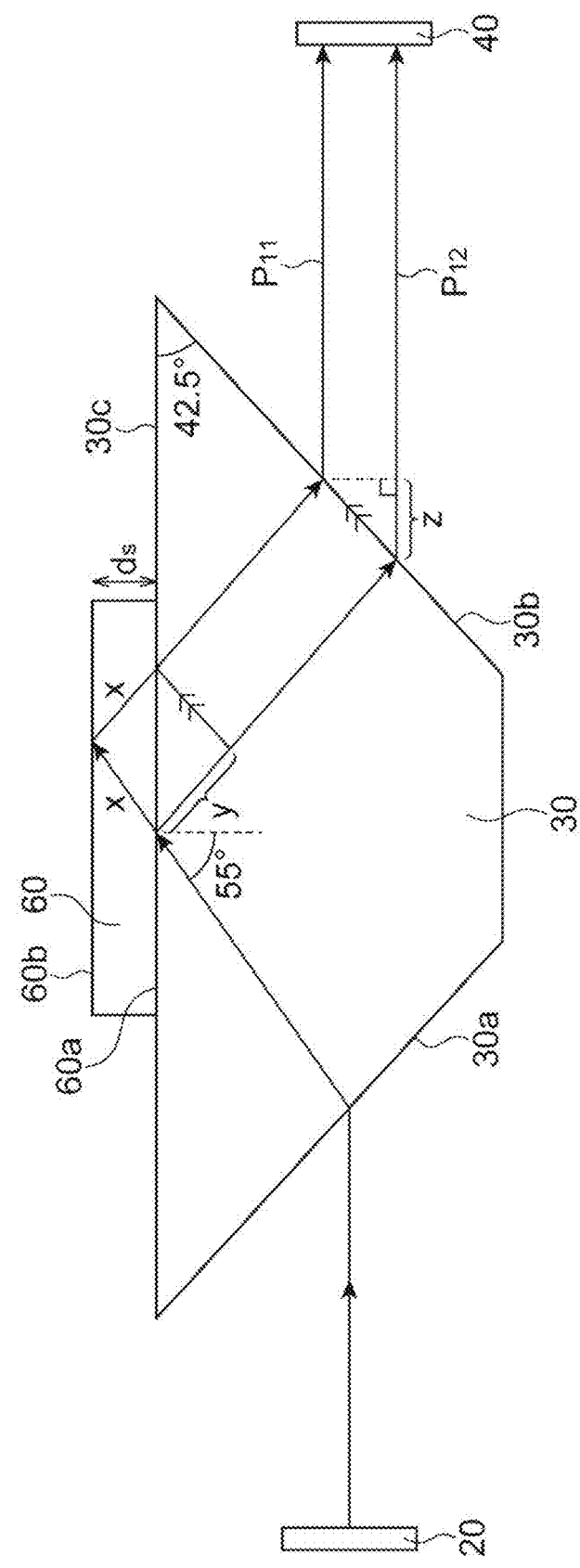
FIG. 12 is a diagram for describing a specific configuration example of a terahertz wave generation element 20, the prism 30, the terahertz wave detection element 40, and the measurement auxiliary member 60.

Numerical examples of the first to third modes will be described with reference to FIG. 12. FIG. 12 is a diagram for describing a specific configuration example of the terahertz wave generation element 20, the prism 30, the terahertz wave detection element 40, and the measurement auxiliary member 60. Here, it is assumed that the terahertz wave generation element 20 is a ZnTe crystal having a thickness of 0.3 mm and a refractive index of 2.4. It is assumed that the terahertz wave detection element 40 is a ZnTe crystal having a thickness of 0.5 mm and a refractive index of 2.4. It is assumed that the prism 30 and the measurement auxiliary member 60 are made of silicon having a refractive index of 3.42. It is assumed that an angle formed between the output surface 30b and the arrangement surface 30c of the prism 30 is 42.5 degrees. It is assumed that an incident angle of the terahertz wave to the total reflection surface 60b of the measurement auxiliary member 60 is 55 degrees. Further, it is assumed that there is no optical element capable of causing multiple reflection of terahertz waves other than the terahertz wave generation element 20 and the terahertz wave detection element 40.

At this time, an increment $\Delta p_e$ of the optical path length caused by multiple reflection of the terahertz wave in the terahertz wave generation element 20 is 1.44 mm (=0.3×2× 2.4). An increment $\Delta p_d$ of the optical path length caused by multiple reflection of the terahertz wave in the terahertz wave detection element 40 is 2.40 mm (=0.5×2×2.4). An increment $\Delta p$ of the optical path length of the main pulse $P_{11}$ relative to the interface reflected pulse $P_{12}$ is expressed by the following formula using an optical path length 2x of the main pulse $P_{11}$ in the measurement auxiliary member 60, an optical path difference y between both pulses inside the prism 30, and an optical path difference z between both pulses between the output surface 30b of the prism 30 and the terahertz wave detection element 40. In this formula, $d_s$ is the thickness of the measurement auxiliary member 60.

$$\Delta p = 2x - y - z$$
$$= 2d_s \left\{ \frac{1}{\cos 55} - \left( \tan 55 \sin 35 - \frac{\tan 55 \sin 55}{\cos 12.5} \sin 12.5 \right) - \frac{\tan 55 \sin 55}{\cos 12.5} \cos 42.5 \right\}$$
$$= 0.6 d_s$$

Assuming that a pulse width equivalent length of the terahertz wave is $d_w$, in the first mode, $\Delta p$ is preferably larger than a value obtained by adding $d_w$ to a larger value (2.40 mm) in $\Delta p_e$ and $\Delta p_d$. That is, in the first mode, the thickness $d_s$ of the measurement auxiliary member 60 is preferably larger than 4.0 mm+$d_w$/0.6 (=(2.40+$d_w$)/0.6). In the second mode, Δp is preferably smaller than a value obtained by subtracting $d_w$ from a smaller value (1.44 mm) in $Δp_e$ and $Δp_d$. That is, in the second mode, the thickness $d_s$ of the measurement auxiliary member 60 is preferably smaller than 2.4 mm−$d_w$/0.6 (=(1.44−$d_w$)/0.6). Further, in the third mode, the thickness $d_s$ of the measurement auxiliary member 60 is preferably larger than 2.4 mm+$d_w$/0.6 and smaller than 4.0 mm−$d_w$/0.6.

Here, a part of the pulse of the terahertz wave is repetitively multiply-reflected inside the terahertz wave generation element 20 in some cases, and is also repetitively multiply-reflected inside the terahertz wave detection element 40 in some cases. Further, a part of the pulse of the terahertz wave is multiply-reflected inside both the terahertz wave generation element 20 and the terahertz wave detection element 40 in some cases. Although it is preferable to set these pulses of the terahertz waves not to overlap with the main pulse $P_{11}$, these pulses of the terahertz waves have small peaks and thus, can be ignored.

Figure 13:
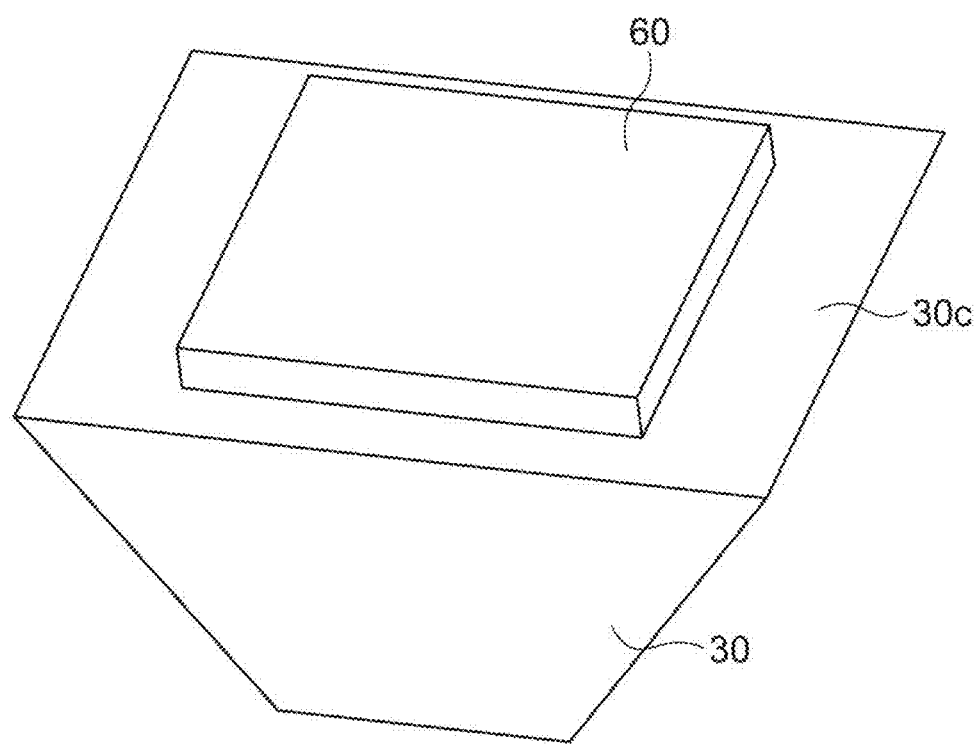
FIG. 13 is a perspective view illustrating a configuration of the prism 30 and the measurement auxiliary member 60.

FIG. 13 is a perspective view illustrating the configuration of the prism 30 and the measurement auxiliary member 60. It is preferable that the input-output surface 60a of the measurement auxiliary member 60 and the arrangement surface 30c of the prism 30 be in close contact with each other in order to propagate the terahertz wave from the prism 30 to the measurement auxiliary member 60 with high efficiency and to propagate the terahertz wave from the measurement auxiliary member 60 to the prism 30 with high efficiency. In order to enhance the close contact therebetween, it is preferable to use a pressing jig 70 as illustrated in FIG. 14, and FIG. 15A, FIG. 15B.

Figure 14:
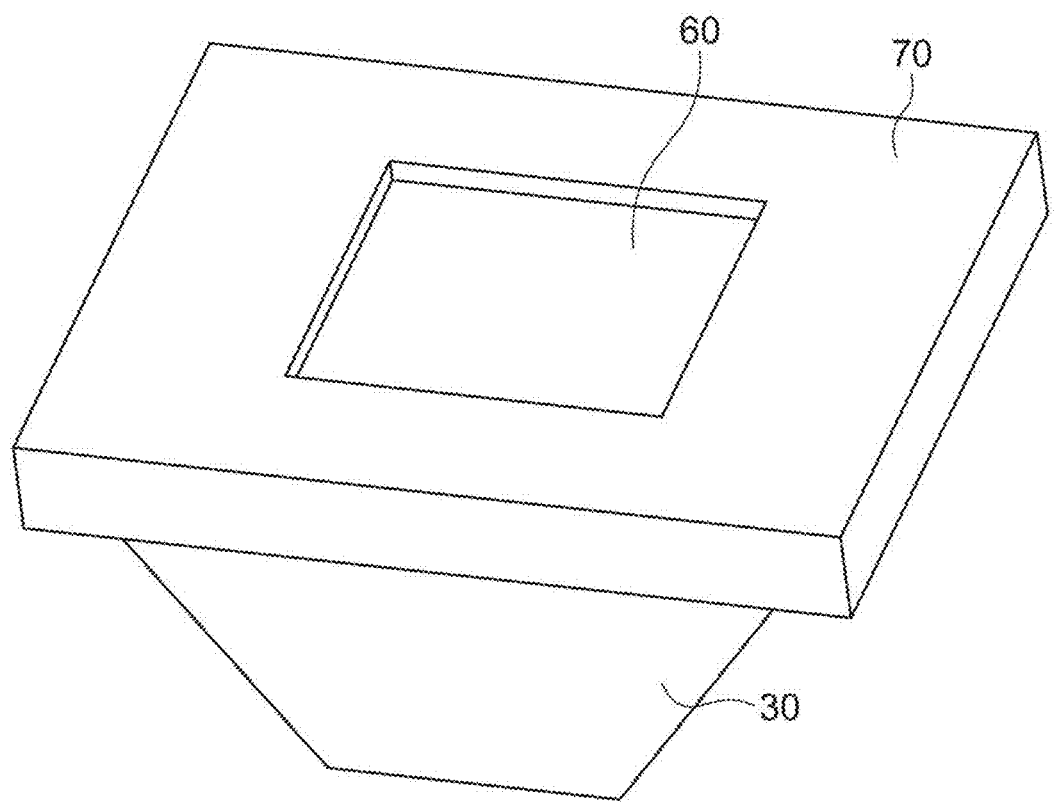
FIG. 14 is a perspective view illustrating a configuration of the prism 30, the measurement auxiliary member 60, and a pressing jig 70.
Figure 15A:
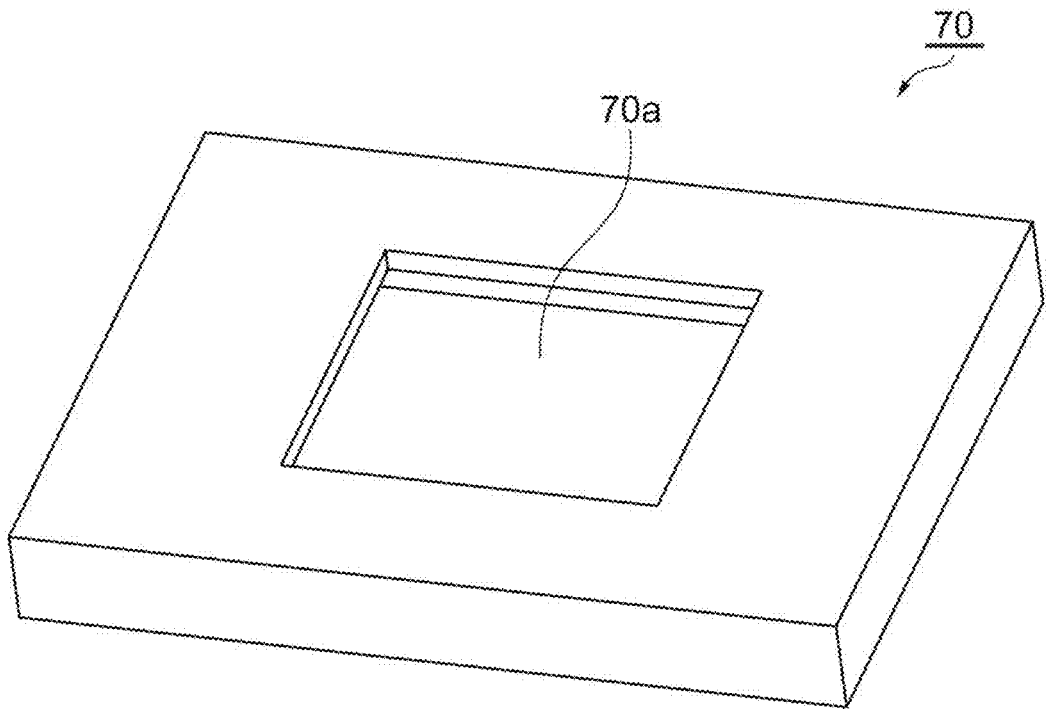
FIG. 15A and FIG. 15B are (A) a perspective view as viewed obliquely from above, and (B) a perspective view as viewed obliquely from below, of the pressing jig 70.
Figure 15B:
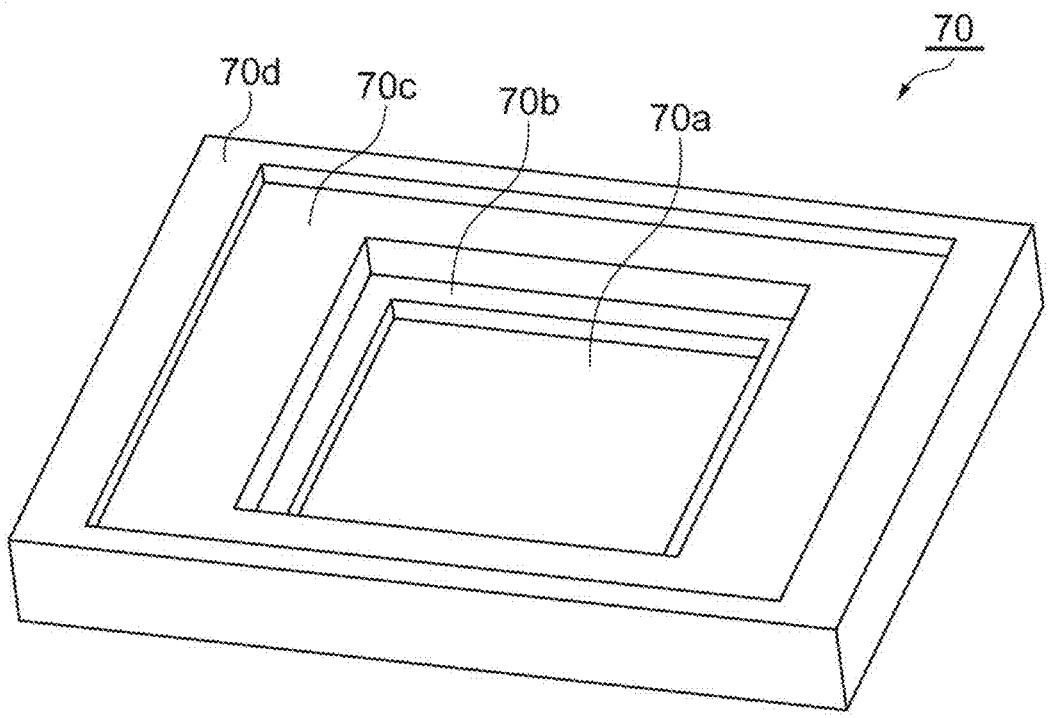

FIG. 14 is a perspective view illustrating the configuration of the prism 30, the measurement auxiliary member 60, and the pressing jig 70. FIG. 15A and FIG. 15B are perspective views of the pressing jig 70. FIG. 15A is the perspective view as viewed obliquely from above. FIG. 15B is the perspective view as viewed obliquely from below.

The pressing jig 70 is a jig configured to press the measurement auxiliary member 60 toward the prism 30. The pressing jig 70 has an opening 70a in a central region as viewed from above or below. Further, the pressing jig 70 has a first region 70b around the opening 70a, a second region 70c around the first region 70b, and a third region 70d around the second region 70c on a lower surface side as illustrated in FIG. 15B. An outer frame of the first region 70b is substantially the same as or somewhat larger than the size of the measurement auxiliary member 60. An outer frame of the second region 70c is substantially the same as or somewhat larger than the size of the arrangement surface 30c of the prism 30. A step, subsequently the same as or somewhat smaller than the thickness of the measurement auxiliary member 60, is provided between the first region 70b and the second region 70c. A step is also provided between the second region 70c and the third region 70d.

As illustrated in FIG. 14, in a state where the measurement auxiliary member 60 is placed on the arrangement surface 30c of the prism 30 and is further covered with the pressing jig 70, the arrangement surface 30c of the prism 30 is fitted into the second region 70c surrounded by the third region 70d of the pressing jig 70, and the measurement auxiliary member 60 is fitted into the first region 70b surrounded by the second region 70c of the pressing jig 70. The measurement object S is placed in a region of the total reflection surface 60b of the measurement auxiliary member 60 exposed in the opening 70a of the pressing jig 70. Further, the close contact between the input-output surface 60a of the measurement auxiliary member 60 and the arrangement surface 30c of the prism 30 can be enhanced by pressing the pressing jig 70 toward the prism 30.

A material of the pressing jig 70 is arbitrary. When the pressing jig 70 is made of a hard material such as metal and ceramics, it is preferable to insert a film made of resin having elasticity or the like between the first region 70b on the lower surface side of the pressing jig 70 and the measurement auxiliary member 60, and between the second region 70c and the prism 30. As a result, the prism 30 and the measurement auxiliary member 60 can be protected.

Next, various modifications of measurement auxiliary members that can be used in the terahertz wave spectroscopic measurement apparatus or the terahertz wave spectroscopic measurement method according to the present embodiment will be described.

Figure 16:
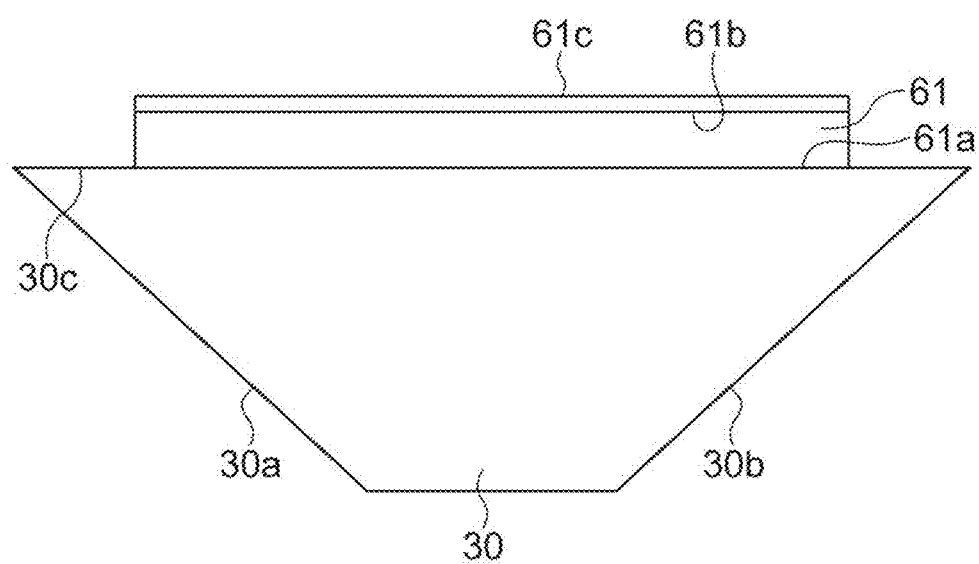
FIG. 16 is a diagram illustrating a configuration of a measurement auxiliary member 61 according to a first modification.

FIG. 16 is a diagram illustrating a configuration of a measurement auxiliary member 61 according to a first modification. The measurement auxiliary member 61 is a flat plate shaped member that is transparent in the wavelength region of the terahertz wave, and has an input-output surface 61a and a total reflection surface 61b that are parallel to each other. The measurement auxiliary member 61 is arranged such that the input-output surface 61a faces the arrangement surface 30c of the prism 30. A measurement object is placed on the total reflection surface 61b of the measurement auxiliary member 61. A thickness or a refractive index of the measurement auxiliary member 61 is set such that the main pulse $P_{11}$ and the noise pulse $P_{14}$ are temporally separated from each other when detecting the correlation by the terahertz wave detection element 40.

A layer 61c configured to enhance the close contact of the measurement object is formed on the total reflection surface 61b of the measurement auxiliary member 61. For example, when the layer 61c is a hard coating layer, the measurement object can be strongly pressed toward the measurement auxiliary member 61, and thus, the close contact of the measurement object to the total reflection surface 61b of the measurement auxiliary member 61 can be enhanced. Further, when the layer 61c is a surface treated layer (for example, a hydrophilic treated layer) suitable for the measurement object, it is possible to enhance the close contact of the measurement object to the total reflection surface 61b of the measurement auxiliary member 61 in a case where the measurement object is a liquid, in a case where the measurement object is a cell in a culture solution, and the like.

Figure 17:
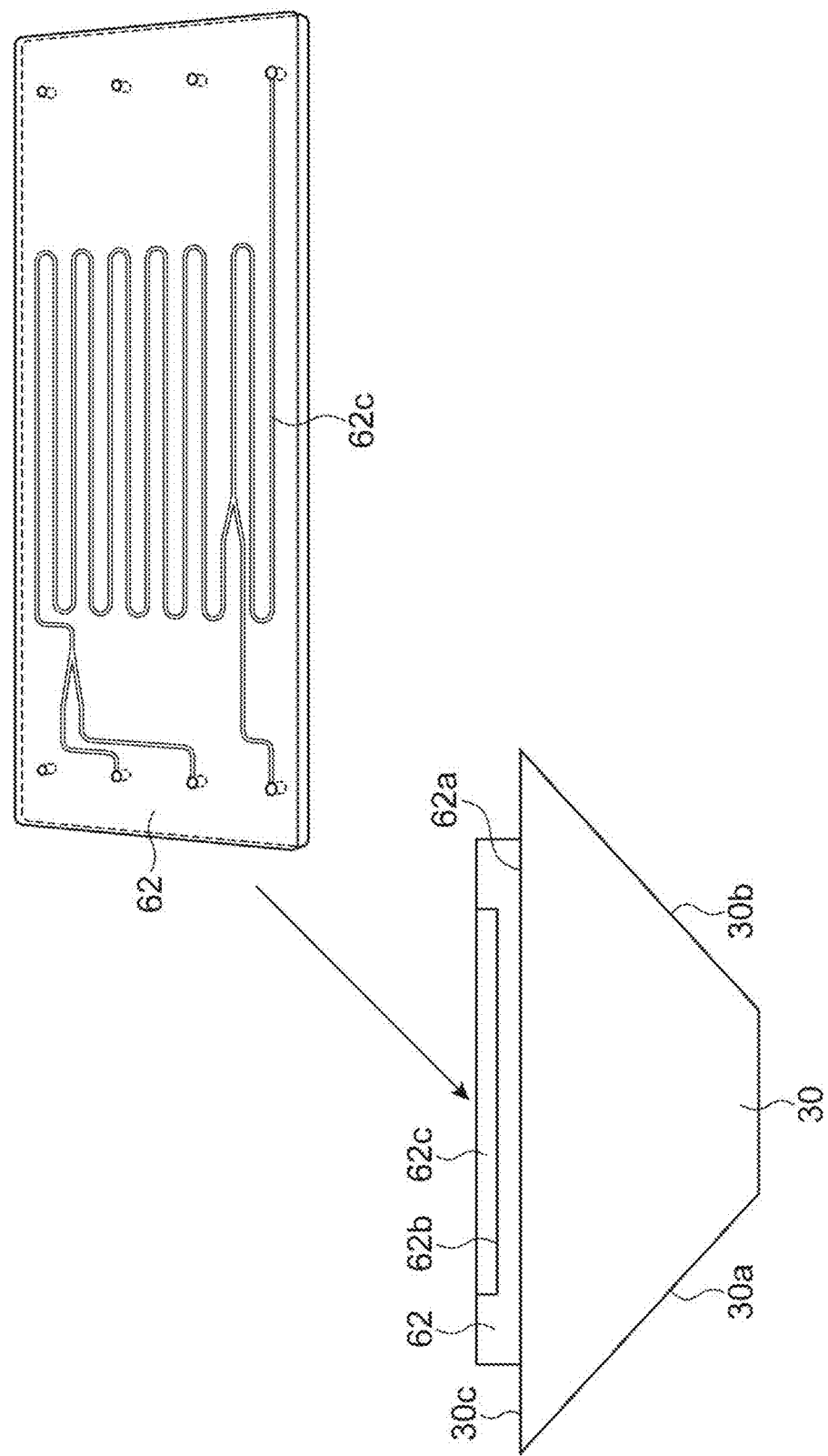
FIG. 17 is a diagram illustrating a configuration of a measurement auxiliary member 62 according to a second modification.

FIG. 17 is a diagram illustrating a configuration of a measurement auxiliary member 62 according to a second modification. The measurement auxiliary member 62 is a flat plate shaped member that is transparent in the wavelength region of the terahertz wave, and has an input-output surface 62a and a total reflection surface 62b that are parallel to each other. The measurement auxiliary member 62 is arranged such that the input-output surface 62a faces the arrangement surface 30c of the prism 30. A measurement object is placed on the total reflection surface 62b of the measurement auxiliary member 62. A thickness or a refractive index of the measurement auxiliary member 62 is set such that the main pulse $P_{11}$ and the noise pulse $P_{14}$ are temporally separated from each other when detecting the correlation by the terahertz wave detection element 40.

A flow path 62c through which the measurement object flows is formed on the total reflection surface 62b of the measurement auxiliary member 62. A bottom surface of the flow path 62c is the total reflection surface 62b. A depth of the flow path 62c is set to such a degree that the reflection of the terahertz wave on an upper surface of the measurement auxiliary member 62 is not superimposed as noise with respect to a main pulse. In this modification, the terahertz wave is totally reflected by the bottom surface of the flow path. It is possible to perform a terahertz wave spectroscopic measurement on a measurement object flowing through the flow path of the measurement auxiliary member 62.

Figure 18:
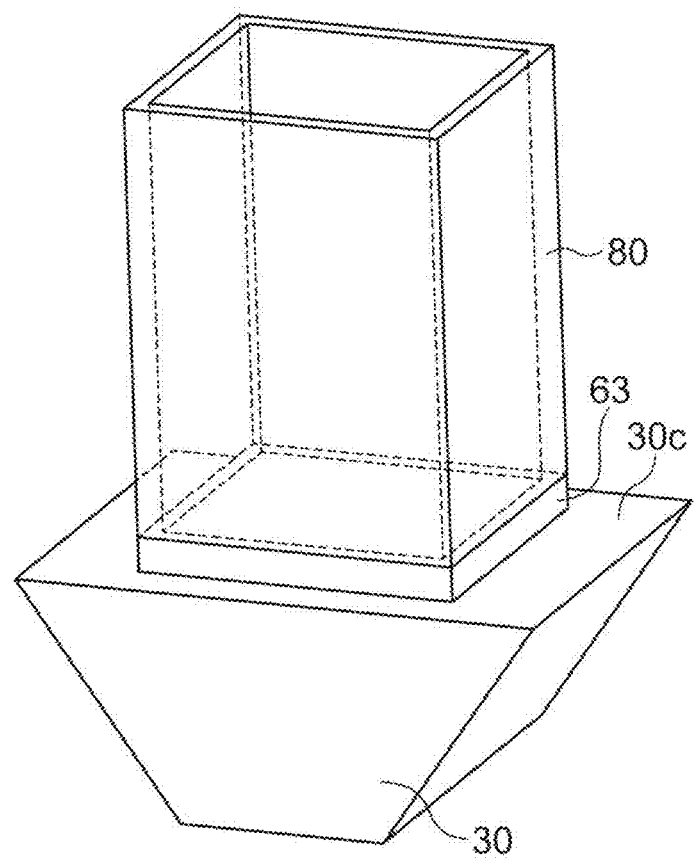
FIG. 18 is a diagram illustrating a configuration of a measurement auxiliary member 63 according to a third modification.

FIG. 18 is a diagram illustrating a configuration of a measurement auxiliary member 63 according to a third modification. The measurement auxiliary member 63 is a flat plate shaped member that is transparent in the wavelength region of the terahertz wave, and forms a bottom portion of a container 80. The measurement auxiliary member 63 has an input-output surface (an outer surface of the bottom portion of the container 80) and a total reflection surface (an inner surface of the bottom portion of the container 80) that are parallel to each other. The container 80 is arranged on the arrangement surface 30c of the prism 30, and a measurement object is placed into the container. A thickness or a refractive index of the measurement auxiliary member 63 is set such that the main pulse $P_{11}$ and the noise pulse $P_{14}$ are temporally separated from each other when detecting the correlation by the terahertz wave detection element 40. This modification is suitable to perform a terahertz wave spectroscopic measurement on a liquid measurement object. When the container 80 is sealed, it is suitable to perform the terahertz wave spectroscopic measurement not only for the liquid but also for a gas measurement object.

Figure 19:
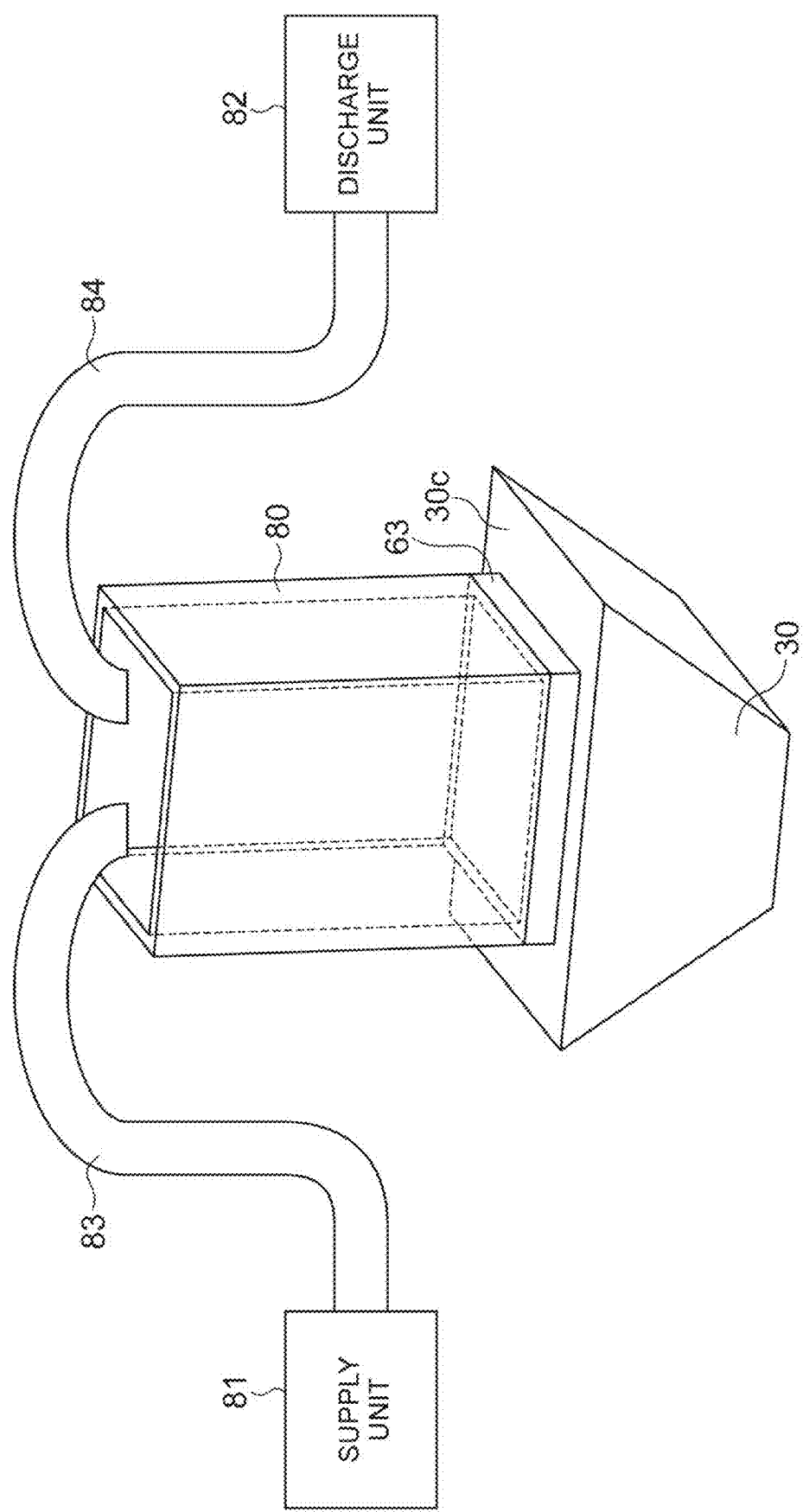
FIG. 19 is a diagram illustrating a configuration of the prism 30, a container 80, a supply unit 81, and a discharge unit 82.

As illustrated in FIG. 19, it is also suitable to provide mechanisms for supply and discharge of the measurement object for the container 80. FIG. 19 is a diagram illustrating a configuration of the prism 30, the container 80, a supply unit 81, and a discharge unit 82. The supply unit 81 is connected to the container 80 via a pipe 83, and can supply the measurement object into the container 80. The discharge unit 82 is connected to the container 80 via a pipe 84, and can discharge the measurement object from the container 80. In this modification, the terahertz wave spectroscopic measurement can be performed on the measurement object, supplied into the container 80 by the supply unit 81, so that it is possible to measure a change in a property of the measurement object. For example, it is possible to collect a part from the liquid in the middle of a reaction and determine a degree of the progress of the reaction as the measurement object, and thereafter, return the measurement object to the original state without disposal.

Figure 20A:
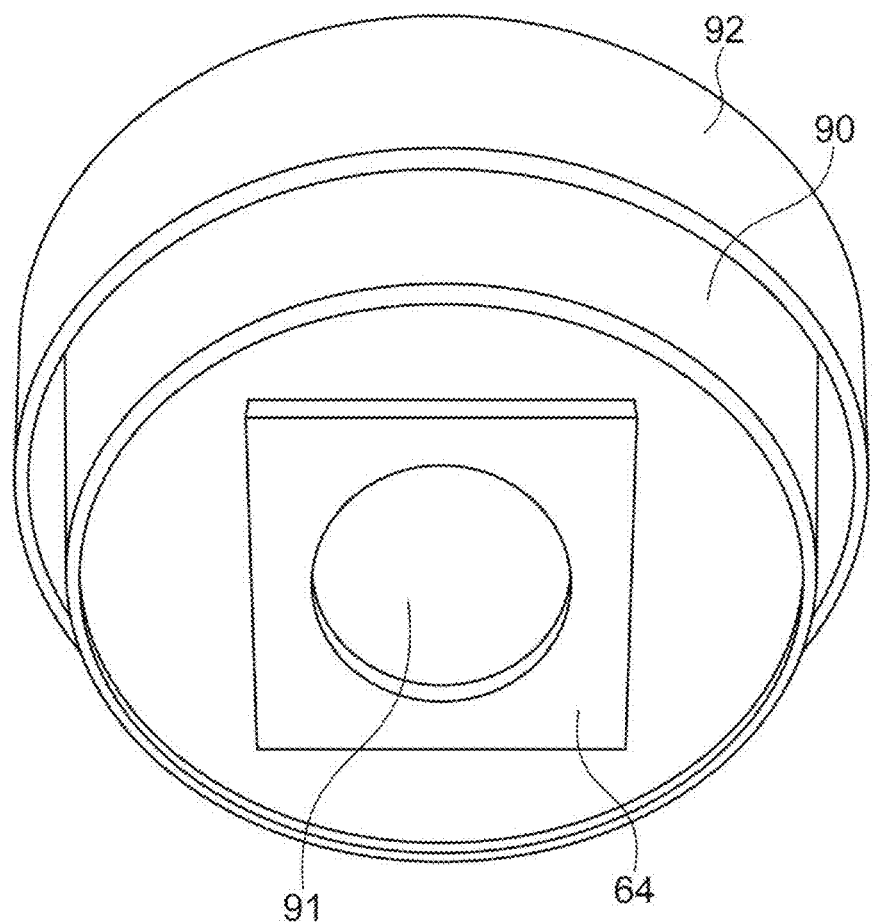
FIG. 20A and FIG. 20B are (A) a perspective view as viewed obliquely from below and (B) a cross-sectional view, illustrating a configuration of a measurement auxiliary member 64 according to a fourth modification.
Figure 20B:
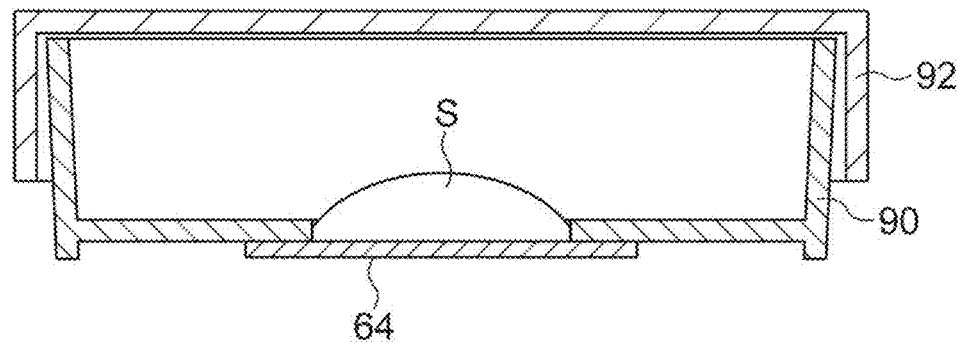

FIG. 20A and FIG. 20B are views illustrating a configuration of a measurement auxiliary member 64 according to a fourth modification.

FIG. 20A is a perspective view when viewed obliquely from below. FIG. 20B is a cross-sectional view.

The measurement auxiliary member 64 is a flat plate shaped member that is transparent in the wavelength region of the terahertz wave. The measurement auxiliary member 64 is joined to a bottom portion of a container 90 so as to cover an opening 91 provided in a central region of the bottom portion from outside, and forms a part of the bottom portion of the container 90. The measurement auxiliary member 64 has an input-output surface (an outer surface of the bottom portion of the container 90) and a total reflection surface (an inner surface of the bottom portion of the container 90) that are parallel to each other. The container 90 is arranged on the arrangement surface 30c of the prism 30, and a measurement object S is placed into the container. The measurement object S placed in the container 90 is selectively arranged on the measurement auxiliary member 64 in the bottom portion of the container 90. A thickness or a refractive index of the measurement auxiliary member 64 is set such that the main pulse $P_{11}$ and the noise pulse $P_{14}$ are temporally separated from each other when detecting the correlation by the terahertz wave detection element 40. Further, a lid 92 covering an upper portion of the container 90 is provided.

This modification is suitable to perform a terahertz wave spectroscopic measurement when the measurement object S is a cell in a culture solution. That is, the cell in the culture solution is selectively arranged on the measurement auxiliary member 64 in the bottom portion of the container 90, and thus, it is possible to perform the terahertz wave spectroscopic measurement on the cell easily. Further, it is possible to suppress evaporation of the culture solution by covering the upper portion of the container 90 with the lid 92, and thus, it is possible to perform the stable terahertz wave spectroscopic measurement on the cell in the culture solution.

The terahertz wave spectroscopic measurement apparatus and the terahertz wave spectroscopic measurement method according to the present invention are not limited to the above embodiment and configuration examples, and various modifications can be made.

The terahertz wave spectroscopic measurement apparatus of the above embodiment is configured to include (1) a light source configured to output pulsed laser light; (2) a branching unit configured to branch the pulsed laser light to output pump light and probe light; (3) a terahertz wave generation element configured to generate and output a terahertz wave by the input of the pump light; (4) a prism configured to have an input surface, an output surface, and an arrangement surface, propagate the terahertz wave output from the terahertz wave generation element and input to the input surface in the inside from the input surface to the arrangement surface, propagate in the inside from the arrangement surface to the output surface, and output the terahertz wave from the output surface to the outside; (5) a measurement auxiliary member configured to have an input-output surface and a total reflection surface, be arranged such that the input-output surface faces the arrangement surface of the prism, allow a measurement object to be arranged on the total reflection surface, propagate the terahertz wave input to the input-output surface from the arrangement surface of the prism in the inside from the input-output surface to the total reflection surface to be totally reflected by the total reflection surface, propagate the totally-reflected terahertz wave in the inside from the total reflection surface to the input-output surface to be output from the input-output surface, and input the terahertz wave from the arrangement surface to the inside of the prism; and (6) a terahertz wave detection element configured to input the terahertz wave output from the output surface of the prism and the probe light output from the branching unit and detect a correlation between the terahertz wave and the probe light.

Further, in the above terahertz wave spectroscopic measurement apparatus, a thickness or a refractive index of the measurement auxiliary member is set such that a pulse (main pulse) of a terahertz wave totally reflected by the total reflection surface of the measurement auxiliary member without being multiply-reflected inside any optical element on an optical path of the terahertz wave, and a pulse (noise pulse) of a terahertz wave multiply-reflected inside any optical element on the optical path of the terahertz wave and reflected on an interface between the prism and the measurement auxiliary member, are temporally separated from each other when detecting the correlation by the terahertz wave detection element.

The terahertz wave spectroscopic measurement method of the above embodiment performs a terahertz wave spectroscopic measurement on a measurement object by branching pulsed laser light output from a light source by a branching unit to output pump light and probe light, generating and outputting a terahertz wave by a terahertz wave generation element by the input of the pump light, and detecting a correlation between the terahertz wave having passed through the measurement object and the probe light by a terahertz wave detection element. The above terahertz wave spectroscopic measurement method is configured to include (a) arranging a prism configured to have an input surface, an output surface, and an arrangement surface, and a measurement auxiliary member configured to have an input-output surface and a total reflection surface, on an optical path of the terahertz wave such that the input-output surface of the measurement auxiliary member faces the arrangement surface of the prism, and arranging the measurement object on the total reflection surface of the measurement auxiliary member; (b) propagating the terahertz wave output from the terahertz wave generation element and input to the input surface of the prism in the inside of the prism from the input surface to the arrangement surface, and then, propagating the terahertz wave in the inside of the measurement auxiliary member from the input-output surface to the total reflection surface to totally reflect the terahertz wave by the total reflection surface of the measurement auxiliary member; and (c) propagating the totally-reflected terahertz wave in the inside of the measurement auxiliary member from the total reflection surface to the input-output surface, and then, propagating the terahertz wave in the inside of the prism from the arrangement surface to the output surface to output the terahertz wave from the output surface of the prism to the terahertz wave detection element.

Further, in the above terahertz wave spectroscopic measurement method, in the terahertz wave spectroscopic measurement, the measurement auxiliary member of which a thickness or a refractive index is set such that a pulse (main pulse) of a terahertz wave totally reflected by the total reflection surface of the measurement auxiliary member without being multiply-reflected inside any optical element on an optical path of the terahertz wave, and a pulse (noise pulse) of a terahertz wave multiply-reflected inside any optical element on the optical path of the terahertz wave and reflected on an interface between the prism and the measurement auxiliary member, are temporally separated from each other when detecting the correlation by the terahertz wave detection element is used.

In the above terahertz wave spectroscopic measurement apparatus and method, the thickness or the refractive index of the measurement auxiliary member may be set such that the main pulse is positioned temporally after the noise pulse when detecting the correlation by the terahertz wave detection element. Further, the thickness or the refractive index of the measurement auxiliary member may be set such that the main pulse is positioned temporally before the noise pulse when detecting the correlation by the terahertz wave detection element.

Further, in the above terahertz wave spectroscopic measurement apparatus and method, the thickness or the refractive index of the measurement auxiliary member may be set such that the main pulse is positioned between adjacent noise pulses when a plurality of noise pulses are present to be temporally separated from each other when detecting the correlation by the terahertz wave detection element.

In the above terahertz wave spectroscopic measurement apparatus and method, the measurement auxiliary member may be made of a material identical to a material of the prism. Further, a pressing jig configured to press the measurement auxiliary member toward the prism may be used. Further, the measurement auxiliary member may be a flat plate shaped member.

In the above terahertz wave spectroscopic measurement apparatus and method, a layer for enhancing close contact of the measurement object may be formed on the total reflection surface of the measurement auxiliary member. Further, a flow path through which the measurement object flows may be formed on the total reflection surface of the measurement auxiliary member, and the terahertz wave spectroscopic measurement may be performed on the measurement object flowing in the flow path.

In the above terahertz wave spectroscopic measurement apparatus and method, the measurement auxiliary member may be a member forming a bottom portion of a container. Further, in this case, a supply unit configured to supply the measurement object into the container and a discharge unit configured to discharge the measurement object from the container may be used to perform the terahertz wave spectroscopic measurement on the measurement object supplied into the container by the supply unit.

The present invention can be used as a terahertz wave spectroscopic measurement apparatus and a terahertz wave spectroscopic measurement method capable of suppressing deterioration in measurement accuracy in the configuration in which the measurement auxiliary member for placing the measurement object is provided separately from the prism.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A terahertz wave spectroscopic measurement apparatus comprising:
   a light source configured to output pulsed laser light;
   a branching unit configured to branch the pulsed laser light to output pump light and probe light;
   a terahertz wave generation element configured to generate and output a terahertz wave by inputting the pump light;
   a prism configured to have an input surface, an output surface, and an arrangement surface, propagate the terahertz wave output from the terahertz wave generation element and input to the input surface in the inside from the input surface to the arrangement surface, propagate in the inside from the arrangement surface to the output surface, and output the terahertz wave from the output surface to the outside;
   a measurement auxiliary member configured to have an input-output surface and a total reflection surface, be arranged such that the input-output surface faces the arrangement surface of the prism, allow a measurement object to be arranged on the total reflection surface, propagate the terahertz wave input to the input-output surface from the arrangement surface of the prism in the inside from the input-output surface to the total reflection surface to be totally reflected by the total reflection surface, propagate the totally-reflected terahertz wave in the inside from the total reflection surface to the input-output surface to be output from the input-output surface, and input the terahertz wave from the arrangement surface to the inside of the prism; and a terahertz wave detection element configured to input the terahertz wave output from the output surface of the prism and the probe light output from the branching unit and detect a correlation between the terahertz wave and the probe light, wherein the measurement object is irradiated with an evanescent component generated at the time of total reflection of the terahertz wave on the total reflection surface of the measurement auxiliary member for acquiring information on the measurement object, and a thickness or a refractive index of the measurement auxiliary member is set such that a main pulse, which is a pulse of a terahertz wave totally reflected by the total reflection surface of the measurement auxiliary member without being multiply-reflected inside any optical element on an optical path of the terahertz wave, and a noise pulse, which is a pulse of a terahertz wave multiply-reflected inside any optical element on the optical path of the terahertz wave and reflected on an interface between the prism and the measurement auxiliary member, are temporally separated from each other when detecting the correlation by the terahertz wave detection element.

2. The terahertz wave spectroscopic measurement apparatus according to claim 1, wherein the thickness or the refractive index of the measurement auxiliary member is set such that the main pulse is positioned temporally after the noise pulse when detecting the correlation by the terahertz wave detection element.

3. The terahertz wave spectroscopic measurement apparatus according to claim 1, wherein the thickness or the refractive index of the measurement auxiliary member is set such that the main pulse is positioned temporally before the noise pulse when detecting the correlation by the terahertz wave detection element.

4. The terahertz wave spectroscopic measurement apparatus according to claim 1, wherein the thickness or the refractive index of the measurement auxiliary member is set such that the main pulse is positioned between adjacent noise pulses when a plurality of noise pulses are present to be temporally separated from each other when detecting the correlation by the terahertz wave detection element.

5. The terahertz wave spectroscopic measurement apparatus according to claim 1, wherein the measurement auxiliary member is made of a material identical to a material of the prism.

6. The terahertz wave spectroscopic measurement apparatus according to claim 1, further comprising a pressing jig configured to press the measurement auxiliary member toward the prism.

7. The terahertz wave spectroscopic measurement apparatus according to claim 1, wherein the measurement auxiliary member is a flat plate shaped member.

8. The terahertz wave spectroscopic measurement apparatus according to claim 1, wherein a layer for enhancing close contact of the measurement object is formed on the total reflection surface of the measurement auxiliary member.

9. The terahertz wave spectroscopic measurement apparatus according to claim 1, wherein a flow path through which the measurement object flows is formed on the total reflection surface of the measurement auxiliary member.

10. The terahertz wave spectroscopic measurement apparatus according to claim 1, wherein the measurement auxiliary member is a member forming a bottom portion of a container.

11. The terahertz wave spectroscopic measurement apparatus according to claim 10, further comprising a supply unit configured to supply the measurement object into the container; and a discharge unit configured to discharge the measurement object from the container.

12. The terahertz wave spectroscopic measurement apparatus according to claim 1, wherein the measurement auxiliary member is placed on the arrangement surface of the prism such that the measurement auxiliary member is attachable and detachable with respect to the prism.

13. A terahertz wave spectroscopic measurement method for performing a terahertz wave spectroscopic measurement on a measurement object by branching pulsed laser light output from a light source by a branching unit to output pump light and probe light, generating and outputting a terahertz wave by a terahertz wave generation element by inputting the pump light, and detecting a correlation between the terahertz wave passed through the measurement object and the probe light by a terahertz wave detection element, the method comprising:

arranging a prism configured to have an input surface, an output surface, and an arrangement surface, and a measurement auxiliary member configured to have an input-output surface and a total reflection surface, on an optical path of the terahertz wave such that the input-output surface of the measurement auxiliary member faces the arrangement surface of the prism, and arranging the measurement object on the total reflection surface of the measurement auxiliary member;

propagating the terahertz wave output from the terahertz wave generation element and input to the input surface of the prism in the inside of the prism from the input surface to the arrangement surface, and then, propagating the terahertz wave in the inside of the measurement auxiliary member from the input-output surface to the total reflection surface to totally reflect the terahertz wave by the total reflection surface of the measurement auxiliary member; and propagating the totally-reflected terahertz wave in the inside of the measurement auxiliary member from the total reflection surface to the input-output surface, and then, propagating the terahertz wave in the inside of the prism from the arrangement surface to the output surface to output the terahertz wave from the output surface of the prism to the terahertz wave detection element, wherein in the terahertz wave spectroscopic measurement, the measurement object is irradiated with an evanescent component generated at the time of total reflection of the terahertz wave on the total reflection surface of the measurement auxiliary member for acquiring information on the measurement object, and the measurement auxiliary member of which a thickness or a refractive index is set such that a main pulse, which is a pulse of a terahertz wave totally reflected by the total reflection surface of the measurement auxiliary member without being multiply-reflected inside any optical element on an optical path of the terahertz wave, and a noise pulse, which is a pulse of a terahertz wave multiply-reflected inside any optical element on the optical path of the terahertz wave and reflected on an interface between the prism and the measurement auxiliary member, are temporally separated from each other when detecting the correlation by the terahertz wave detection element is used.

14. The terahertz wave spectroscopic measurement method according to claim 13, wherein the measurement auxiliary member of which the thickness or the refractive index is set such that the main pulse is positioned temporally after the noise pulse when detecting the correlation by the terahertz wave detection element is used.

15. The terahertz wave spectroscopic measurement method according to claim 13, wherein the measurement auxiliary member of which the thickness or the refractive index is set such that the main pulse is positioned temporally before the noise pulse when detecting the correlation by the terahertz wave detection element is used.

16. The terahertz wave spectroscopic measurement method according to claim 13, wherein the measurement auxiliary member of which the thickness or the refractive index is set such that the main pulse is positioned between adjacent noise pulses when a plurality of noise pulses are present to be temporally separated from each other when detecting the correlation by the terahertz wave detection element is used.

17. The terahertz wave spectroscopic measurement method according to claim 13, wherein the measurement auxiliary member is made of a material identical to a material of the prism.

18. The terahertz wave spectroscopic measurement method according to claim 13, wherein a pressing jig configured to press the measurement auxiliary member toward the prism is used.

19. The terahertz wave spectroscopic measurement method according to claim 13, wherein the measurement auxiliary member is a flat plate shaped member.

20. The terahertz wave spectroscopic measurement method according to claim 13, wherein a layer for enhancing close contact of the measurement object is formed on the total reflection surface of the measurement auxiliary member.

21. The terahertz wave spectroscopic measurement method according to claim 13, wherein a flow path through which the measurement object flows is formed on the total reflection surface of the measurement auxiliary member, and the terahertz wave spectroscopic measurement is performed on the measurement object flowing in the flow path.

22. The terahertz wave spectroscopic measurement method according to claim 13, wherein the measurement auxiliary member is a member forming a bottom portion of a container.

23. The terahertz wave spectroscopic measurement method according to claim 22, wherein a supply unit configured to supply the measurement object into the container and a discharge unit configured to discharge the measurement object from the container are used to perform the terahertz wave spectroscopic measurement on the measurement object supplied into the container by the supply unit.

24. The terahertz wave spectroscopic measurement method according to claim 13, wherein the measurement auxiliary member is placed on the arrangement surface of the prism such that the measurement auxiliary member is attachable and detachable with respect to the prism.

* * * * *